United States Patent

Noura et al.

[11] Patent Number: 6,045,870
[45] Date of Patent: Apr. 4, 2000

[54] HIGH SOLID COATING COMPOSITION AND METHOD FOR FORMING TOPCOAT USING SAME

[75] Inventors: Kohsuke Noura; Yoshiyuki Yukawa; Masaaki Saika, all of Hiratsuka; Motoshi Yabuta, Hatano; Yasumasa Okumura, Nisshin, all of Japan

[73] Assignee: Kansai Paint Co., Ltd., Amagasaki, Japan

[21] Appl. No.: 09/145,427

[22] Filed: Sep. 1, 1998

[30] Foreign Application Priority Data

Sep. 3, 1997 [JP] Japan .................................. 9-238019
Sep. 9, 1997 [JP] Japan .................................. 9-244367
Oct. 9, 1997 [JP] Japan .................................. 9-277394

[51] Int. Cl.$^7$ ........................................................ B05D 3/02
[52] U.S. Cl. .......................... 427/387; 525/100; 428/447
[58] Field of Search .................................. 525/100, 101, 525/102, 103, 208, 209; 427/387, 407.1; 428/383, 447

[56] References Cited

U.S. PATENT DOCUMENTS 5,719,234  2/1998  Yabuta et al. ............................. 525/101
5,945,483  8/1999  Iwamura et al. ......................... 525/110
5,962,588  10/1999  Iwamura et al. ....................... 525/103

*Primary Examiner*—Robert Dawson
*Assistant Examiner*—Jeffrey B. Robertson
*Attorney, Agent, or Firm*—Armstrong, Westerman, Hattori, McLeland & Naughton

[57] ABSTRACT

An organic solvent-based heat-curable high solid coating composition comprising:

(A) a carboxyl-containing compound having an acid value of 50 to 500 mg KOH/g wherein 20 mol % or more of the carboxyl groups are silylated carboxyl groups, (B) at least one epoxide selected from (B-1) an epoxy-, hydroxyl- and hydrolyzable alkoxysilyl-containing vinyl polymer, (B-2) the vinyl polymer (B-1) wherein 20 mol % or more of the hydroxyl groups are silylated hydroxyl groups, and (B-3) an epoxy compound having a number average molecular weight less than 1,000, and (C) a crosslinked particulate polymer, the composition having a solid content of 65 wt. % or more; and a method for forming a topcoat using the composition. The composition of the invention has a sufficiently high solid content, is capable of forming a coating film with high resistance to acids and the like, and is excellent in low-temperature curability, storage stability and recoat adhesion.

17 Claims, No Drawings

HIGH SOLID COATING COMPOSITION AND METHOD FOR FORMING TOPCOAT USING SAME

The present invention relates to a novel organic solvent-based heat-curable high solid coating composition and a method for forming a topcoat using same.

In recent years, acid rain has posed a world-wide problem of etching and blots on topcoats, in particular clear coats, of automotive exterior panels. With the spread of car washers, scratches made on automobiles by car washers have presented another problem. Various proposals have been made on topcoat compositions capable of forming coating films having good resistance to acids and scratches (e.g., Japanese Unexamined Patent Publications Nos. 187,749/1987 and 166,741/1994). However, the proposed compositions are unsatisfactory in low-temperature curability, storage stability or recoat adhesion.

On the other hand, it is of urgent necessity in the field of coating compositions to take measures for conformity to the solvent use regulation established to prevent air pollution and conserve resources. Such measures include development of high solid coating compositions which contain less amount of organic solvents and which have a higher solid concentration. It is difficult, however, to obtain a coating composition which has an increased solid content of, for example, 65 wt. % or more, and which retains the capability of giving coating films with sufficient performance.

The present applicant proposed a high solid coating composition which is capable of giving a coating film having high resistance to acids and scratches and excellent in low-temperature curability, storage stability and recoat adhesion. The proposed composition comprises a carboxyl-containing compound, an epoxy-, hydroxyl- and hydrolyzable alkoxysilyl-containing vinyl polymer, a reactive organopolysiloxane and a crosslinked particulate polymer (Japanese Unexamined Patent Publication No. 143,421/1997).

The proposed composition, however, does not have a sufficiently high solid content, and thus coating compositions with a higher solid content are needed from the viewpoints of prevention of air pollution and conservation of resources.

An object of the present invention is to provide an organic solvent-based heat-curable coating composition with a sufficiently high solid content, which is capable of giving a coating film with high resistance to acids or high resistance to acids and scratches and which is excellent in low-temperature curability, storage stability and recoat adhesion.

Another object of the invention is to provide a method for forming a topcoat using said high solid coating composition.

Other objects and features of the invention will become apparent from the following description.

The present invention provides an organic solvent-based heat-curable high solid coating composition comprising:

(A) a carboxyl-containing compound with an acid value of 50 to 500 mg KOH/g, wherein 20 mol % or more of the carboxyl groups are silylated carboxyl groups represented by the formula

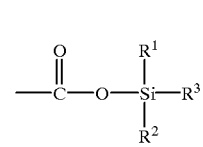

wherein $R^1$ and $R^2$ are the same or different and each represent a $C_{1-18}$ alkyl group, a $C_{1-6}$ alkoxyl group, a phenyl group, an aryl group, a trimethylsiloxy group, a hydrogen atom, a chlorine atom or a fluorine atom; and $R^3$ is a $C_{1-18}$ alkyl group, a phenyl group, an aryl group or a trimethylsiloxy group;

(B) at least one epoxide selected from (B-1) an epoxy-, hydroxyl- and hydrolyzable alkoxysilyl-containing vinyl polymer, (B-2) the vinyl polymer (B-1) wherein 20 mol % or more of the hydroxyl groups are silylated hydroxyl groups represented by the formula

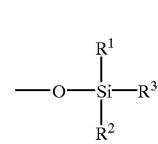

wherein $R^1$, $R^2$ and $R^3$ are as defined above, and (B-3) an epoxy compound having a number average molecular weight less than 1,000; and (C) a crosslinked particulate polymer, the composition having a solid content of 65 wt. % or more.

The present invention further provides a method for forming a topcoat comprising successively forming a colored base coat and a clear coat on a substrate, wherein the clear coat is formed from the above coating composition.

The inventors of the present invention conducted extensive research to achieve the above objects and found that, when the coating composition of Japanese Unexamined Patent Publication No. 143,421/1997 is prepared using the carboxyl-containing compound after specific silylation of carboxyl groups, thickening of the composition caused by carboxyl groups is suppressed and the above object can be accomplished. They further found the following. With respect to the coating composition disclosed in the publication, thickening of the composition caused by hydroxyl groups can be suppressed by specific silylation of hydroxyl groups in the epoxy-, hydroxyl- and hydrolyzable alkoxysilyl-containing vinyl polymer, and the reactive organopolysiloxane can be dispensed with when scratch resistance is not important. The present invention has been completed based on these novel findings.

The components of the coating composition of the invention will be specifically described below.

The compound (A) for use in the invention is a carboxyl-containing compound with an acid value of 50 to 500 mg KOH/g, wherein 20 mol % or more of the carboxyl groups are silylated carboxyl groups represented by the formula

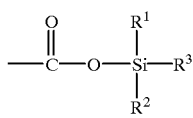

(1)

wherein $R^1$ and $R^2$ are the same or different and each represent a $C_{1-18}$ alkyl group, a $C_{1-6}$ alkoxyl group, a phenyl group, an aryl group, a trimethylsiloxy group, a hydrogen atom, a chlorine atom or a fluorine atom; and $R^3$ is a $C_{1-18}$ alkyl group, a phenyl group, an aryl group or a trimethylsiloxy group.

The silylation of carboxyl groups in the compound (A) suppresses thickening caused by carboxyl groups and makes it possible to obtain a coating composition having a high solid content of usually 65 wt. % or more. The silylation of carboxyl groups is also advantageous in that, when a reactive organopolysiloxane (D) described hereinafter is used, the compatibility of the compound (A) with the organopolysiloxane is increased.

In the formula (1), the $C_{1-18}$ alkyl group represented by $R^1$, $R^2$ and $R^3$ is, for example, methyl, ethyl, n-propyl, isopropyl, n-butyl, isobutyl, t-butyl, hexyl, 2-ethylhexyl, n-octyl, dodecyl or octadecyl, and the aryl group is, for example, benzyl, phenethyl or tolyl. The $C_{1-6}$ alkoxyl group represented by $R^1$ and $R^2$ is, for example, methoxy, ethoxy, n-propoxy, isopropoxy, n-butoxy, isobutoxy, t-butoxy or hexoxy.

It is necessary for the preparation of the compound (A) that the carboxyl-containing compound before silylation have an acid value of 50 to 500 mg KOH/g, preferably 80 to 300 mg KOH/g, in view of acid resistance and scratch resistance of the resulting coating film, and curability and storage stability of the coating composition.

For obtaining a coating composition having a high solid content of at least 65 wt. %, 20 mol % or more, preferably 50 mol % or more, of the carboxyl groups in the carboxyl-containing compound need to be silylated.

It is desirable that the compound (A) contains 10 to 500 mg KOH/g, preferably 16 to 300 mg KOH/g of silylated carboxyl groups in terms of acid value.

The silylated carboxyl group in the compound (A) is preferably the group represented by the formula (1) wherein each of $R^1$, $R^2$ and $R^3$ is methyl or ethyl, since such a silylated carboxyl group has good reactivity and generates a small amount of silyl compound in the curing step. Particularly preferred is a trimethylsiloxycarbonyl group represented by the formula (3), i.e., a group of the formula (1) wherein all of $R^1$, $R^2$ and $R^3$ are methyl.

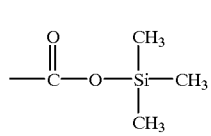

(3)

Examples of preferred carboxyl-containing compounds before silylation include (A-1) a carboxyl-containing vinyl polymer and (A-2) a carboxyl-containing polyester compound.

(A-1) Carboxyl-containing Vinyl Polymer

Examples of such polymers are copolymers of a carboxyl-containing vinyl monomer and other vinyl monomer. Preferred are vinyl polymers having at least one half-esterified acid anhydride group in the molecule.

Examples of carboxyl-containing vinyl monomers include acrylic acid, methacrylic acid, crotonic acid, itaconic acid and maleic acid; and vinyl monomers obtained by half-esterifying the acid anhydride group in acid anhydride group-containing vinyl monomers such as maleic anhydride and itaconic anhydride.

The term "half-esterified acid anhydride group" as used herein means a group consisting of a carboxyl group and a carboxylic acid ester group, which is obtained by adding an aliphatic monohydric alcohol to an acid anhydride group for ring-opening (i.e., half esterification). The half-esterified acid anhydride group is hereinafter sometimes referred to simply as "half ester group".

Examples of half ester group-containing vinyl polymers include copolymers obtained by half-esterifying the acid anhydride group in copolymers of an acid anhydride group-containing vinyl monomer, such as maleic anhydride and itaconic anhydride, and other vinyl monomer.

In the case where the half ester group is introduced into the copolymer, the half esterification can be done either before or after the copolymerization reaction.

Examples of aliphatic monohydric alcohols usable for the half esterification are low-molecular weight monohydric alcohols such as methanol, ethanol, isopropanol, tert-butanol, isobutanol, methyl cellosolve and ethyl cellosolve. The half esterification reaction is carried out in conventional manners at room temperature to about 80° C., optionally using a tertiary amine as a catalyst.

Examples of other vinyl monomers for preparing the vinyl polymer include hydroxyl-containing vinyl monomers; (meth)acrylic acid esters; vinyl ethers and allyl ethers; olefin compounds and diene compounds; hydrocarbon ring-containing unsaturated monomers; and nitrogen-containing unsaturated monomers.

Examples of the hydroxyl-containing vinyl monomers are 2-hydroxyethyl (meth)acrylate, 3-hydroxypropyl (meth)acrylate, hydroxybutyl (meth)acrylate and like $C_{2-8}$ hydroxyalkyl esters of acrylic or methacrylic acids; monoesters of polyether polyols such as polyethylene glycol, polypropylene glycol and polybutylene glycol with unsaturated carboxylic acids such as (meth)acrylic acid; monoethers of polyether polyols such as polyethylene glycol, polypropylene glycol and polybutylene glycol with hydroxyl-containing unsaturated monomers such as 2-hydroxyethyl (meth)acrylate; monoesters or diesters of acid anhydride group-containing unsaturated compounds such as maleic anhydride and itaconic anhydride with glycols such as ethylene glycol, 1,6-hexanediol and neopentyl glycol; hydroxyalkyl vinyl ethers such as hydroxyethyl vinyl ether; allyl alcohol; 2-hydroxypropyl (meth)acrylate; adducts of α,β-unsaturated carboxylic acids with monoepoxy compounds such as CARDULA E10 (tradename, product of Shell Petrochemical Co., Ltd.) and α-olefin epoxide; adducts of glycidyl (meth)acrylate with monobasic acids such as acetic acid, propionic acid, p-tert-butylbenzoic acid and aliphatic acids; and adducts of the above hydroxyl-containing monomers with lactones (e.g., ε-caprolactone and γ-valerolactone).

Examples of the (meth)acrylic acid esters are methyl acrylate, ethyl acrylate, propyl acrylate, isopropyl acrylate, n-butyl acrylate, isobutyl acrylate, tert-butyl acrylate, hexyl acrylate, 2-ethylhexyl acrylate, n-octyl acrylate, decyl acrylate, stearyl acrylate, lauryl acrylate, cyclohexyl acrylate, methyl methacrylate, ethyl methacrylate, n-propyl methacrylate, isopropyl methacrylate, n-butyl methacrylate, isobutyl methacrylate, tert-butyl methacrylate, hexyl methacrylate, 2-ethylhexyl methacrylate, octyl methacrylate, decyl methacrylate, lauryl methacrylate, stearyl methacrylate, cyclohexyl methacrylate and like $C_{1-24}$ alkyl esters or cycloalkyl esters of acrylic or methacrylic acids; and methoxybutyl acrylate, methoxybutyl methacrylate, methoxyethyl acrylate, methoxyethyl methacrylate, ethoxybutyl acrylate, ethoxybutyl methacrylate and like $C_{2-18}$ alkoxyalkyl esters of acrylic or methacrylic acids.

Examples of the vinyl ethers and allyl ethers are ethyl vinyl ether, n-propyl vinyl ether, isopropyl vinyl ether, butyl vinyl ether, tert-butyl vinyl ether, pentyl vinyl ether, hexyl vinyl ether, octyl vinyl ether and like chain-like alkyl vinyl ethers; cyclopentyl vinyl ether, cyclohexyl vinyl ether and like cycloalkyl vinyl ethers; phenyl vinyl ether, trivinyl ether and like aryl vinyl ethers; benzyl vinyl ether, phenethyl vinyl ether and like aralkyl vinyl ethers; and allyl glycidyl ether, allyl ethyl ether and like allyl ethers.

Examples of the olefin compounds and diene compounds include ethylene, propylene, butylene, vinyl chloride, butadiene, isoprene and chloroprene.

Examples of the hydrocarbon ring-containing unsaturated monomers are styrene, α-methylstyrene, phenyl (meth)acrylate, phenylethyl (meth)acrylate, phenylpropyl (meth)acrylate, benzyl (meth)acrylate, phenoxyethyl (meth)acrylate, cyclohexyl (meth)acrylate, 2-acryloyloxyethylhydrogen phthalate, 2-acryloyloxypropylhydrogen phthalate, 2-acryloyloxypropylhexahydrohydrogen phthalate, 2-acryloyloxypropyltetrahydrohydrogen phthalate, esters of p-tert-butyl-benzoic acid with hydroxyethyl (meth)acrylate, dicyclopentenyl (meth)acrylate, etc.

Examples of the nitrogen-containing unsaturated monomers are N,N-dimethylaminoethyl (meth)acrylate, N,N-diethylaminoethyl (meth)acrylate, N-t-butylaminoethyl (meth)acrylate and like nitrogen-containing alkyl (meth)acrylates; acrylamide, methacrylamide, N-methyl (meth)acrylamide, N-ethyl (meth)acrylamide, N,N-dimethyl (meth)acrylamide, N,N-dimethylaminopropyl (meth)acrylamide, N,N-dimethylaminoethyl (meth)acrylamide and like polymerizable amides; 2-vinylpyridine, 1-vinyl-2-pyrrolidone, 4-vinylpyridine and like aromatic nitrogen-containing monomers; acrylonitrile, methacrylonitrile and like polymerizable nitriles; and allylamines.

The copolymerization can be carried out by conventional methods for copolymerizing vinyl monomers. The most suitable method is solution radical polymerization in an organic solvent, in view of application range and costs. More specifically, the desired polymer can be easily obtained by copolymerization at about 60 to 150° C. in an organic solvent in the presence of a polymerization initiator such as azobisisobutyronitrile or benzoyl peroxide. Useful organic solvents include aromatic solvents such as xylene and toluene; ketone solvents such as methyl ethyl ketone and methyl isobutyl ketone; ester solvents such as ethyl acetate, butyl acetate, isobutyl acetate and 3-methoxybutyl acetate; and alcohols such as n-butanol and isopropyl alcohol.

The carboxyl-, half ester group- or acid anhydride group-containing vinyl monomer and other vinyl monomer are copolymerized in the following proportions based on the total weight of the monomers. A suitable proportion of former vinyl monomer is about 5 to 40 wt. %, preferably about 10 to 30 wt. %, in view of curability and storage stability. A suitable proportion of the latter vinyl monomer is about 60 to 95 wt. %, preferably about 70 to about 90% by weight. If styrene is employed as the other monomer, it is used suitably in a proportion of up to about 20 wt. % in view of weatherability of the coating film. When an acid anhydride group-containing vinyl monomer is used, half esterification is carried out after copolymerization, as described above.

The compound (A-1) is preferably an acrylic polymer having a number average molecular weight of 2,000 to 10,000, in view of weatherability of the coating film and compatibility with the epoxide (B) and reactive organopolysiloxane (D).

(A-2) Carboxyl-containing Polyester Compound

Examples of such compounds are carboxyl-containing polyester polymers, and low-molecular weight half esters having a number average molecular weight less than 1,000 and formed by addition reaction of polyols with 1,2-acid anhydrides (hereinafter sometimes referred to as "low-molecular weight half esters"). Among them, preferred are the low-molecular weight half esters.

The carboxyl-containing polyester polymer can be easily prepared by condensation reaction of a polyhydric alcohol with a polycarboxylic acid. Useful polyhydric alcohols include, for example, ethylene glycol, butylene glycol, 1,6-hexanediol, trimethylolpropane and pentaerythritol. Useful polycarboxylic acids include, for example, adipic acid, terephthalic acid, isophthalic acid, phthalic anhydride and hexahydrophthalic anhydride. More specifically, the carboxyl-containing polyester polymer can be prepared, for example, by a one-step reaction using a reaction system containing excess carboxyl groups of the polycarboxylic acid, or by a reaction using a reaction system containing excess hydroxyl groups of the polyhydric alcohol to give a hydroxyl-terminated polyester polymer, followed by an addition reaction of the polymer with an acid anhydride group-containing compound such as phthalic anhydride, hexahydrophthalic anhydride or succinic anhydride.

The number average molecular weight of the obtained carboxyl-containing polyester polymer is usually 1,000 or more, preferably about 1,100 to 2,000.

The low-molecular weight half ester is obtained by reacting a polyol with a 1,2-acid anhydride under conditions which can effect a ring-opening reaction of the acid anhydride but substantially do not cause a polyesterification reaction of the produced carboxyl groups. The obtained reaction product has a low molecular weight and narrow molecular weight distribution. Further, the reaction product has a low volatile organic content when incorporated in the composition and imparts excellent properties to the resulting coating film.

The number average molecular weight of the low-molecular weight half ester is usually less than 1,000, preferably 400 to 900.

The low-molecular weight half ester is prepared by the reaction of a polyol with a 1,2-acid anhydride in an inert atmosphere, such as a nitrogen atmosphere, in the presence of a solvent. Preferred solvents are, for example, ketones such as methyl amyl ketone, diisobutyl ketone and methyl isobutyl ketone; aromatic hydrocarbons such as toluene and xylene; and other organic solvents such as dimethylformamide and N-methylpyrrolidone.

The reaction is carried out preferably at a low temperature of about 150° C. or less. Specifically, the reaction temperature is preferably about 70 to 150° C., more preferably about 90 to 120° C. A temperature exceeding 150° C. causes a polyesterification reaction, whereas a temperature less than 70° C. results in unsatisfactory reaction rate. Hence, reaction temperatures outside the specified range are not desirable.

The reaction time slightly varies basically depending on the reaction temperature, but is usually about 10 minutes to about 24 hours.

The equivalent ratio of the 1,2-acid anhydride to the polyol is about 0.8:1 to 1.2:1, as calculating the acid anhydride as monofunctional compound, whereby the desired half ester can be obtained in the maximum yield.

Acid anhydrides usable for the preparation of the low-molecular weight half ester are those having about 4 to 32 carbon atoms. Examples of such acid anhydrides are aliphatic, alicyclic, olefin and cyclic olefin acid anhydrides and aromatic acid anhydrides. The aliphatic acid anhydrides and aromatic acid anhydrides may be substituted, insofar as the substituent does not adversely affect the reactivity of the acid anhydrides or the properties of the resulting half ester. Examples of the substituents are chloro, alkyl and alkoxy. Examples of specific acid anhydrides include succinic anhydride, methylsuccinic anhydride, dodecenylsuccinic anhydride, octadecenylsuccinic anhydride, phthalic anhydride, tetrahydrophthalic anhydride, methyltetrahydrophthalic anhydride, hexahydrophthalic anhydride, alkylhexahydrophthalic anhydride (such as methylhexahydrophthalic anhydride), tetrafluorophthalic anhydride, endomethylenetetrahydrophthalic anhydride, chlorendic anhydride, itaconic anhydride, citraconic anhydride and maleic anhydride.

Usable polyols are those having about 2 to 20 carbon atoms. Diols, triols and mixtures thereof having 2 to 10 carbon atoms are preferred. Suitable examples are aliphatic polyols such as ethylene glycol, 1,2-propanediol, 1,3-propanediol, 1,4-butanediol, 1,5-pentanediol, glycerol, 1,2,3-butanetriol, 1,6-hexanediol, neopentyl glycol, diethylene glycol, dipropylene glycol, 1,4-dimethylol cyclohexane, 3-methyl-1,5-pentanediol, 1,1,1-trimethylolpropane, 2,2,4-trimethylpentane-1,3-diol, pentaerythritol and 1,2,3,4-butanetetraol. Aromatic polyols such as bisphenol A and bis(hydroxymethyl)xylene are also usable.

Carboxyl groups in the carboxyl-containing compound are silylated, for example, by the following methods.

(I) A method comprising reacting the carboxyl-containing compound with an iminodisilane compound according to the reaction scheme (4):

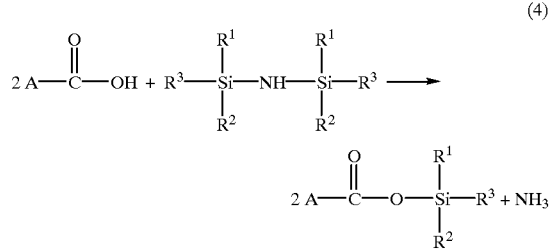

(II) A method comprising reacting the carboxyl-containing compound with a chlorosilane compound according to the reaction scheme (5):

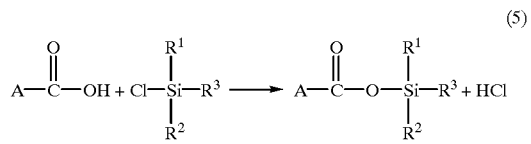

In the reaction schemes (4) and (5),

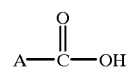

is the carboxyl-containing compound, A is the residue other than the carboxyl group in the carboxyl-containing compound, and $R^1$, $R^2$ and $R^3$ are as defined above and may be the same or different.

The compound (A) can be obtained by silylating the carboxyl-containing compound (A-1) or (A-2) according to the above reaction schemes, but the following method can be also employed.

For example, the compound (A-1) is prepared by copolymerization using, in place of the half ester group-containing vinyl monomer, a vinyl monomer wherein the carboxyl group of the half ester group has been silylated, whereby the compound (A) is obtained.

When the silylated carboxyl group in the compound (A) is heated in the curing step, the silyl group is dissociated, so as to regenerate a free carboxyl group. The regenerated carboxyl group can undergo a crosslinking reaction with the epoxy group in the component (B). The dissociated silyl group usually vaporizes as a silyl compound from the system.

The epoxide (B) for use in the invention is at least one epoxide selected from (B-1) an epoxy-, hydroxyl- and hydrolyzable alkoxysilyl-containing vinyl polymer; (B-2) the vinyl polymer (B-1) wherein 20 mol % or more of the hydroxyl groups are silylated hydroxyl groups represented by the formula

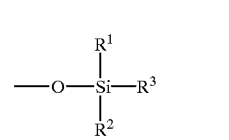

(2)

wherein $R^1$, $R^2$ and $R^3$ are as defined above;
and (B-3) an epoxy compound having a number average molecular weight less than 1,000. The epoxide (B) usually has two or more epoxy groups in the molecule.

The vinyl polymer (B-1) can be easily prepared by copolymerizing an epoxy-containing vinyl monomer, a hydroxyl-containing vinyl monomer, a hydrolyzable alkoxysilyl-containing vinyl monomer and other vinyl monomer by conventional methods similar to those employed in the preparation of the compound (A-1).

Examples of the epoxy-containing vinyl monomers are glycidyl (meth)acrylate and allyl glycidyl ether. Examples of the hydrolyzable alkoxysilyl-containing vinyl monomers are vinyltrimethoxysilane, vinylmethyldimethoxysilane, vinyltriethoxysilane, vinylmethyldiethoxysilane, vinyltris (2-methoxyethoxy)silane, γ-(meth) acryloyloxypropyltrimethoxysilane, γ-(meth) acryloyloxypropylmethyldimethoxysilane, vinyltriacetoxysilane, β-(meth) acryloyloxyethyltrimethoxysilane, γ-(meth) acryloyloxypropyltriethoxysilane and γ-(meth) acryloyloxypropylmethyldiethoxysilane. In view of low-temperature curability and storage stability, vinyl monomers containing a methoxysilyl group or an ethoxysilyl group as the hydrolyzable alkoxysilyl group are preferable. Useful hydroxyl-containing vinyl monomers and other vinyl monomers are as exemplified above.

The epoxy-containing vinyl monomer, hydroxyl-containing vinyl monomer, hydrolyzable alkoxysilyl-containing vinyl monomer and other vinyl monomer are copolymerized in the following proportions based on the total weight of the monomers. A suitable proportion of the epoxy-containing vinyl monomer is about 5 to 60 wt. %, preferably 10 to 40 wt. %, in view of curability, storage stability, and acid resistance and scratch resistance of the coating film. A suitable proportion of the hydroxyl-containing vinyl monomer is about 3 to 50 wt. %, preferably 5 to 30 wt. %, in view of curability, storage stability, and acid resistance, scratch resistance and water resistance of the coating film. A suitable proportion of the hydrolyzable alkoxysilyl-containing vinyl monomer is about 3 to 40 wt. %, preferably 5 to 20 wt. %, in view of curability, acid resistance and scratch resistance of the coating film, and costs. A suitable proportion of the other vinyl monomer is about 10 to 80 wt. %, preferably 20 to 50 wt. %. If styrene is employed as the other monomer, it is used suitably in a proportion of up to about 20 wt. % in view of weatherability of the cured coating.

The polymer (B-1) prepared by the copolymerization of the monomers in said proportion range usually has an epoxy content of 0.5 to 5.0 mmol/g, preferably 0.8 to 2.5 mmol/g, a hydroxyl value of 10 to 200 mg KOH/g, preferably 30 to 120 mg KOH/g, and a hydrolyzable alkoxysilyl content of 0.3 to 5.0 mmol/g, preferably 1.0 to 3.0 mmol/g.

Preferably, the polymer (B-1) is an acrylic polymer having a number average molecular weight of 1,000 to 10,000, in particular 1,000 to 4,000. A number average molecular weight less than 1,000 tends to impair the curability, and the weatherability of the coating film, whereas a number average molecular weight exceeding 10,000 tends to reduce the compatibility with the compound (A) and with the reactive organopolysiloxane (D) and to increase the viscosity. Hence number average molecular weights outside the specified range are undesirable.

The vinyl polymer (B-2) for use in the composition of the invention is a hydroxyl-, epoxy- and hydrolyzable alkoxysilyl-containing vinyl polymer. In the vinyl polymer (B-2), 20 mol % or more of the hydroxyl groups are silylated hydroxyl groups. The silylation suppresses thickening caused by hydroxyl groups, increases the solid content of the coating composition usually to 70 wt. % or more. Further, the silylation improves the compatibility with the reactive organopolysiloxane (D), when the component (D) is used.

The vinyl polymer (B-2) is easily prepared by copolymerizing a silylated hydroxyl-containing vinyl monomer, an epoxy-containing vinyl monomer, a hydrolyzable alkoxysilyl-containing vinyl monomer, an optional hydroxyl-containing vinyl monomer and other vinyl monomer, by methods similar to those employed in the preparation of the compound (A-1).

The silylated hydroxyl-containing vinyl monomer is prepared by silylating hydroxyl groups of a hydroxyl-containing vinyl monomer. The silylated hydroxyl group is represented by the formula:

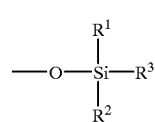

(2)

wherein $R^1$, $R^2$ and $R^3$ are as defined above.

The silylated hydroxyl group is preferably a group represented by the formula (2) wherein each of $R^1$, $R^2$ and $R^3$ is methyl or ethyl, since such a silylated hydroxyl group has good reactivity and generates only a small amount of silyl compound in the curing step. Particularly preferred is a trimethylsiloxy group, i.e., a group of the formula (2) wherein all of $R^1$, $R^2$ and $R^3$ are methyl.

Hydroxyl groups in the hydroxyl-containing vinyl monomer can be silylated, for example, by the following methods (III) and (IV).

(III) A method comprising reacting the hydroxyl-containing vinyl monomer with an iminodisilane compound according to the reaction scheme (6):

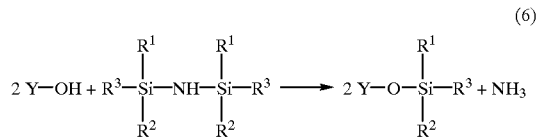

(6)

(IV) A method comprising reacting the hydroxyl-containing vinyl monomer with a chlorosilane compound according to the reaction scheme (7):

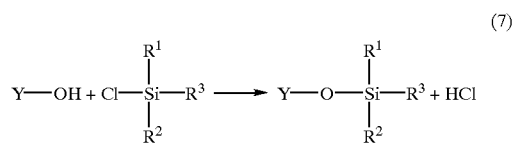

(7)

In the reaction schemes (6) and (7), Y is the residue other than the hydroxyl group in the hydroxyl-containing vinyl monomer, and $R^1$, $R^2$ and $R^3$ are as defined above and may be the same or different.

Useful epoxy-containing vinyl monomers, hydrolyzable alkoxysilyl-containing vinyl monomers, hydroxyl-containing vinyl monomers and other vinyl monomers are as exemplified above.

The silylated hydroxyl-containing vinyl monomer, epoxy-containing vinyl monomer, hydrolyzable alkoxysilyl-containing vinyl monomer, optional hydroxyl-containing vinyl monomer, and other vinyl monomer are copolymerized in the following proportions based on the total weight of the monomers. A suitable proportion of the epoxy-containing vinyl monomer is about 5 to 60 wt. %, preferably 10 to 40 wt. %, in view of curability, storage stability, and acid resistance and scratch resistance of the coating film. A suitable proportion of the silylated hydroxyl-containing vinyl monomer alone or in combination with the unsilylated hydroxyl-containing vinyl monomer is about 3 to 50 wt. %, preferably 5 to 30 wt. %, in view of curability, storage stability, and acid resistance, scratch resistance, water resistance and adhesion of the coating film. A suitable proportion of the hydrolyzable alkoxysilyl-containing vinyl monomer is about 3 to 40% by weight, preferably 5 to 20% by weight, in view of curability, acid resistance and scratch resistance of the coating film, and costs. A suitable proportion of the other vinyl monomer is about 10 to 80 wt. %, preferably 20 to 50 wt. %. When styrene is employed as the other monomer, it is used suitably in a proportion of up to about 20 wt. % in view of weatherability of the cured coating.

The polymer (B-2) prepared by the copolymerization of the monomers in said proportion range usually has an epoxy content of 0.5 to 5.0 mmol/g, preferably 0.8 to 2.5 mmol/g, a hydroxyl value of 10 to 200 mg KOH/g, preferably 30 to 120 mg KOH/g, based on silylated and unsilytlated hydroxyl groups, and a hydrolyzable alkoxysilyl content of 0.3 to 5.0 mmol/g, preferably 1.0 to 3.0 mmol/g.

The polymer (B-2) is preferably an acrylic polymer having a number average molecular weight of 1,000 to 10,000, in particular 1,000 to 4,000. A number average molecular weight less than 1,000 tends to impair the curability, and the weatherability of the coating film, whereas a number average molecular weight exceeding 10,000 tends to reduce the compatibility with the compound (A) and with the reactive organopolysiloxane (D), and to increase the viscosity. Thus, number average molecular weights outside the specified range are not desirable.

The silylated vinyl polymer (B-2) can be prepared by copolymerizing the silylated hydroxyl-containing vinyl monomer and other monomer components as described above, but the following method can be also employed.

For example, the vinyl polymer (B-2) can be obtained by carrying out the copolymerization using an unsilylated hydroxyl-containing vinyl monomer in place of the silylated hydroxyl-containing vinyl monomer, and then silylating hydroxyl groups in the obtained copolymer. The silylation can be effected according to the reaction scheme (6) or (7) using the obtained copolymer in place of the hydroxyl-containing vinyl monomer.

It is necessary that 20 mol % or more, preferably 50 mol % or more, of the hydroxyl groups in the vinyl polymer (B-2) be silylated. If silylated hydroxyl groups account for less than 20 mol % of the hydroxyl groups in the vinyl polymer (B-2), the effects of silylation of hydroxyl groups, i.e., reduction of viscosity and improvement of compatibility with the reactive organopolysiloxane (D), are not fully exhibited.

The epoxy compound (B-3) is not limited and may be any of epoxy compounds having a number average molecular weight less than 1,000. If the epoxy compound (B-3) has a number average molecular weight not less than 1,000, the coating composition has a high viscosity and is unlikely to have a high solid content. The epoxy compound (B-3) usually does not have a hydrolyzable alkoxysilyl group in the molecule. The epoxy compound (B-3) preferably has a number average molecular weight of about 160 to 800, and an epoxy equivalent of about 80 to 400.

Examples of typical epoxy compounds (B-3) are ethylene glycol diglycidyl ether, polyethylene glycol diglycidyl ether, propylene glycol diglycidyl ether, tripropylene glycol diglycidyl ether, polypropylene glycol diglycidyl ether, 1,4-butanediol diglycidyl ether, neopentyl glycol diglycidyl ether, 1,6-hexanediol diglycidyl ether, glycerine diglycidyl ether, diglycerine tetraglycidyl ether, trimethylolpropane triglycidyl ether, 2,6-diglycidyl phenyl ether, sorbitol triglycidyl ether, triglycidyl isocyanurate, diglycidyl amine, diglycidyl benzylamine, phthalic acid diglycidyl ester, bisphenol A diglycidyl ether, butadiene dioxide, dicyclopentadiene dioxide, diesters of 3,4-epoxycyclohexene carboxylic acid with ethylene glycol, 3,4-epoxycyclohexylmethyl-3,4-epoxycyclohexane carboxylate, 3,4-epoxy-6-methylcyclohexylmethyl-3,4-epoxy-6-methylcyclohexane carboxylate, bis(3,4-epoxycyclohexylmethyl)adipate, dicyclopentadienol epoxide glycidyl ether, dipentene dioxide, adducts of bisphenol A type epoxy resins with ethylene oxide, EPOLEAD T 300 (product of Daicel Chemical Industries, Co., Ltd., trifunctional alicyclic epoxy compound), EPOLEAD GT 400 (product of Daicel Chemical Industries, Co., Ltd., tetrafunctional alicyclic epoxy compound); EPOLEAD GT 301, GT 302 and GT 303 (products of Daicel Chemical Industries, Co., Ltd., ring-opened ε-caprolacton chain-containing trifunctional alicyclic epoxy compounds); EPOLEAD GT 401, GT 402 and GT 403 (products of Daicel Chemical Industries, Co., Ltd., ring-opened ε-caprolacton chain-containing tetrafunctional alicyclic epoxy compounds); EPIKOTE 828, 834 and 1001 (products of Yuka Shell Epoxy Co., Ltd., bisphenol A type epoxy resins); EPIKOTE 154 (product of Yuka Shell Epoxy Co., Ltd., cresol novolac type epoxy resin); CELOXIDE 2081, 2082 and 2083 represented by the following formula (8) (products of Daicel Chemical Industries Co., Ltd., CELOXIDE 2081 being represented by the following formula (8) wherein n'=1, CELOXIDE 2082 by the formula (8) wherein n'=2, and CELOXIDE 2083 by the formula (8) wherein n'=3); DENACOL EX-411 represented by the following formula (9) (product of Nagase Kasei Co., Ltd.).

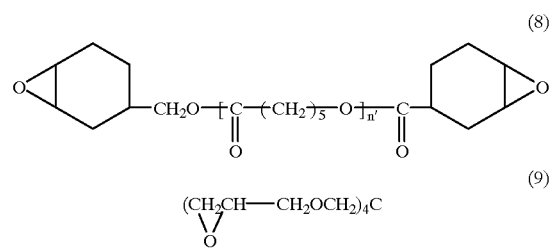

In the formula (8), n' is an integer of 1 to 3.

The epoxide (B) for use in the invention may be one of the vinyl polymer (B-1), the silylated vinyl polymer (B-2) and the epoxy compound (B-3), or a combination of at least two of the polymer (B-1), polymer (B-2) and compound (B-3). The combined use can impart a higher solid content to the coating composition. When the vinyl polymer (B-1) and/or the silylated vinyl polymer (B-2) is used in combination with the epoxy compound (B-3), the mixing ratio is not limited, but a preferable ratio of the polymer(s) (B-1) and/or (B-2) to the compound (B-3) is about 90:10 to 50:50, in terms of solid content.

The crosslinked particulate polymer (C) for use in the invention is insoluble in the carboxyl-containing compound (A), the epoxide (B), the reactive organopolysiloxane (D) and solvents, and can be stably dispersed in the composition of the invention. The component (C) is used to impart thixotropy to the mixture of the components (A), (B) and optionally (D) which form the coating composition.

Specifically, since said mixture substantially has Newtonian flow properties, the coating film formed therefrom has various defects, such as sagging and cissing caused by the application of the mixture to a substrate in a vertical position or by the temperature increase in the baking step subsequent to the application. Contrastingly, if the crosslinked particulate polymer (C) is added to the mixture, the resulting composition has a high apparent viscosity when left to stand, but shows a satisfactorily low viscosity when a high shear stress is applied, as in spray coating. Accordingly, the composition is amenable to spray coating without causing sagging, and exhibits thixotropy in a few seconds or a few minutes after application to the substrate, fully precluding the film defects such as cissing.

Examples of specific crosslinked particulate polymers (C) include known particulate polymers crosslinked in the molecule, which are obtained by aqueous emulsion polymerization, aqueous suspension polymerization or non-aqueous dispersion polymerization. Among them, particulate polymers having an intramolecularly crosslinked structure obtained by aqueous emulsion or aqueous suspension polymerization can be separated as solids by physical or chemical methods such as evaporation or azeotropic distillation of water, or precipitation or aggregation of the polymer (particles). Alternatively, said physical or chemical methods may be carried out so as to directly change the medium of the desired crosslinked particulate polymer from water to a resin or an organic solvent.

Preferably usable as the polymer (C) are crosslinked particulate polymers as disclosed in Japanese Unexamined Patent Publication No. 66,770/1991, which are obtained by subjecting a polymerizable monomer having at least two radically polymerizable unsaturated groups in the molecule and other radically polymerizable unsaturated monomer to emulsion polymerization in the presence of an allyl-containing reactive emulsifier. In this case, the particulate polymer is intramolecularly crosslinked by the function of the polymerizable monomer having at least two radically polymerizable unsaturated groups in the molecule.

Also preferable as the polymer (C) are nonaqueous dispersions of particulate polymers as disclosed in Japanese Unexamined Patent Publication No. 95,116/1989, which are obtained by polymerizing a radically polymerizable unsaturated monomer in an organic liquid using as dispersion stabilizing resin a polymer containing an alkoxysilyl-containing vinyl monomer as an essential monomer component. The obtained particulate polymers are insoluble in the organic liquid. In this case, the particulate polymer is crosslinked by the reaction between alkoxysilyl groups derived from the alkoxysilyl-containing polymerizable vinyl monomer in the dispersion stabilizing resin or the reaction of said alkoxysilyl group with a functional group such as a hydroxyl group in the particulate polymer. More preferably, the particulate polymer is further crosslinked internally using a polymerizable monomer having at least two radically polymerizable unsaturated groups in the molecule, an alkoxysilyl-containing vinyl monomer, or two monomers each having a functional group complementary to a functional group in the other monomer, as the radically polymerizable unsaturated monomer(s) forming the particulate polymer.

Examples of combinations of mutually complementary groups include a combination of isocyanate and hydroxyl and a combination of carboxyl and epoxy. S Examples of usable isocyanate-containing vinyl monomers include isocyanate ethyl (meth)acrylate and m-isopropenyl-α,α-dimethylbenzyl isocyanate. Usable hydroxyl-containing vinyl monomers include those exemplified above, among which 2-hydroxyethyl (meth)acrylate is preferred. Usable carboxyl-containing vinyl monomers include (meth) acrylate. Usable epoxy-containing vinyl monomers include glycidyl (meth)acrylate and methyl glycidyl (meth)acrylate.

The crosslinked particulate polymer has a high crosslinking density, and substantially does not swell or melt even in a solvent with high polymer-dissolving power, such as toluene or ethyl acetate. Further, the particulate polymer, when added to a solution or dispersion of a binder resin in such a high-dissolving-power solvent, can give a solution or dispersion having a high resin content, i.e., a high solid content, without increasing the viscosity of the solution or dispersion. Moreover, when the composition containing the crosslinked particulate polymer is dried, the particulate polymer, together with the binder resin, forms a cured film.

It is suitable that the crosslinked particulate polymer (C) has an average particle diameter of about 0.01 to 2 μm, preferably about 0.05 to 0.5 μm. When the average particle diameter is within the specified range, both of sagging preventing effect and good finish appearance of the coating film can be easily achieved.

The composition of the invention contains, as essential components, the carboxyl-containing compound (A), the epoxide (B) and the crosslinked particulate polymer (C) preferably in the following proportions, in view of curability, prevention of sagging, and acid resistance and finish appearance of the coating film. The proportions of the compound (A) and the epoxide (B) are such that the equivalent ratio of the silylated and unsilylated carboxyl groups in the former to the epoxy groups in the latter is 1:0.5 to 0.5:1, and the proportion of the crosslinked particulate polymer (C) is 1 to 20 wt. parts per 100 wt. parts of the compound (A) and the epoxide (B) combined.

More preferably, the proportions of the compound (A) and the epoxide (B) are such that the equivalent ratio of the silylated and unsilylated carboxyl groups in the former to the epoxy groups in the latter is 1:0.6 to 0.6:1, and the proportion of the crosslinked particulate polymer (C) is 1 to 10 wt. parts per 100 wt. parts of the compound (A) and the epoxide (B) combined.

The composition of the invention may further contain (D) a reactive organopolysiloxane, so as to give a coating film with high resistance to acids and scratches. Further, the composition containing the component (D) has a higher solid content of usually 70 wt. % or more. The reactive organopolysiloxane is a compound having a reactive functional group and an organo group at the side chain and/or the end of the polysiloxane chain, and is not limited insofar as it has compatibility with the compound (A) and the epoxide (B).

The reactive organopolysiloxane (D) may have linear, branched, reticulate, cyclic or like structure.

Examples of specific organo groups (organic groups) include alkyl (methyl, ethyl, propyl, butyl, hexyl, etc.), alkenyl, aryl, allyl and phenyl. In particular, compounds having an organo group such as methyl, vinyl or phenyl are practically advantageous in view of costs.

Examples of specific reactive functional groups include silanol, alkoxysilyl, alcoholic hydroxyl, glycidyl, amino, mercapto, carboxyl, amido, vinyl and (meth)acryloxy. Among them, alkoxysilyl, alcoholic hydroxyl and glycidyl are particularly preferable.

The molecular weight of the component (D) can be liberally selected insofar as the component is compatible with the components (A) and (B), and thus can not be specified in general. However, it is usually suitable that the component (D) has a number average molecular weight of about 100 to 10,000, preferably 300 to 5,000. If the molecular weight is greater than the above range, the compatibility with the components (A) and (B) tends to reduce as the molecular weight increases.

The component (D) has preferably 2 to 300, more preferably 2 to 100, most preferably 3 to 50 silicon atoms in the molecule.

The component (D) is a known compound. Useful compounds include those disclosed in Japanese Unexamined Patent Publications No. 43,696/1993 and No. 70,509/1995. Typical examples of such compounds are shown below.

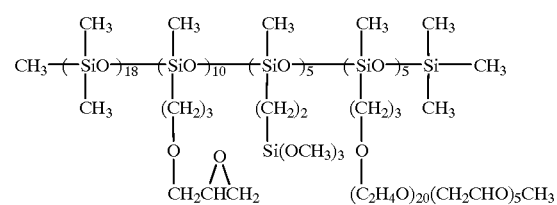

(10)

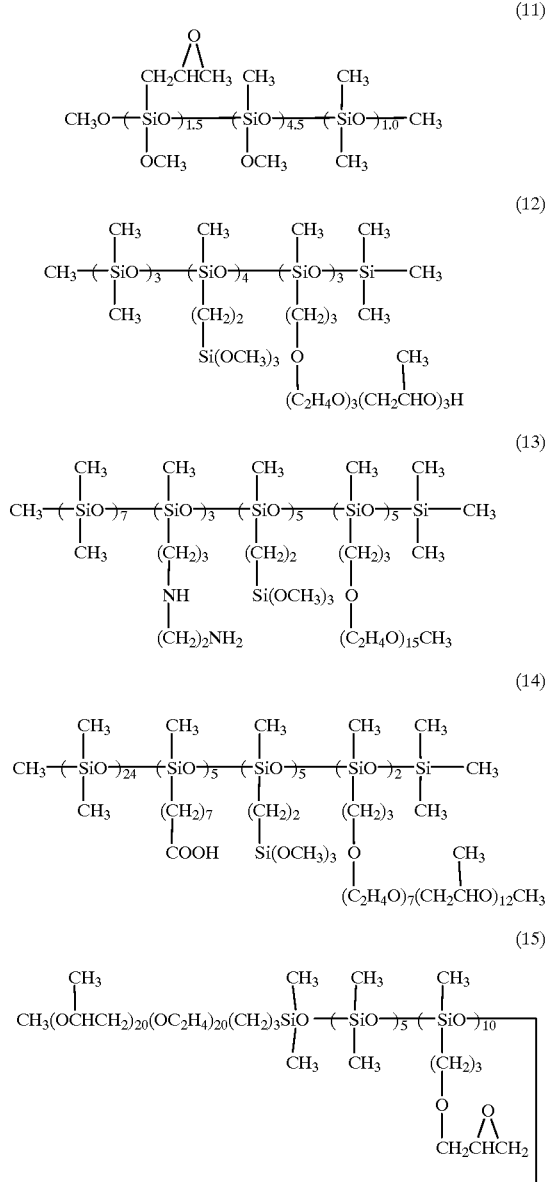

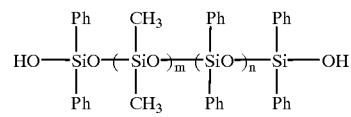

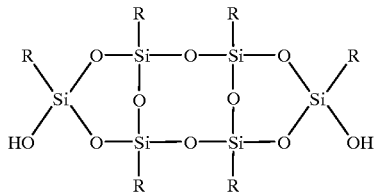

In the formulas (16) to (19), Ph is a phenyl group, R is a phenyl group, a $C_{1-4}$ alkyl group or a hydroxyl group, and m and n each represents an integer of 1 to 50.

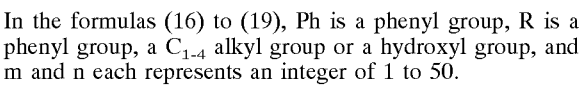

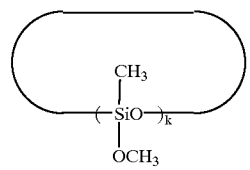

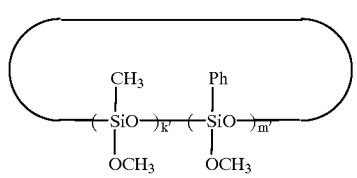

In the formulas (20) and (21), k is an integer of 2 to 20, Ph is a phenyl group, k' and m' each represent an integer of 1 to 10.

The reactive organopolysiloxanes may be used singly or in combination.

The composition of the invention may further contain (E) a polyol compound having a molecular weight less than 1,000 and a hydroxyl value of 120 to 1,000 mg KOH/g, so that the composition has improved curability and a higher solid content.

The polyol compound (E) is a compound having two or more, preferably three or more hydroxyl groups in the molecule and having a molecular weight less than 1,000, preferably 200 to 900, and a hydroxyl value of 120 to 1,000 mg KOH/g, preferably 150 to 800 mg KOH/g.

If the polyol compound (E) has less than two hydroxyl groups in the molecule, the composition is not sufficiently improved in curability, whereas if the molecular weight exceeds 1,000, the composition has an increased viscosity and thus has an insufficient solid content. If the compound (E) has a hydroxyl value less than 120 mg KOH/g, the curability of the composition decreases, whereas if the hydroxyl value exceeds 1,000 mg KOH/g, the viscosity of the composition tends to increase because of hydrogen bond between the hydroxyl groups.

In the step of heating for curing, the compound (E) reacts with reactive groups such as a hydrolyzable alkoxysilyl group and an epoxy group in the epoxide (B) and a silanol group, an alkoxysilyl group and a glycidyl group in the reactive organopolysiloxane (D), contributing to curing. Further, the compound (E) has a low molecular weight and thus serves to reduce the viscosity of the composition.

The polyol compound (E) is not limited and may be any of the compounds that satisfy the above requirements.

Preferred as the polyol compound (E) are, for example, compounds represented by the formula

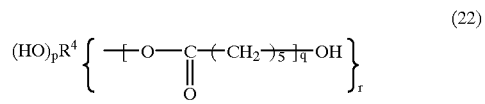
(22)

wherein $R^4$ is a $C_{2-10}$ hydrocarbon group having a valency of (p+r), q is an integer of 1 to 3, p is an integer of 0 to 2, r is an integer of 1 to 3, and (p+r) is an integer of 2 to 4; and acrylic oligomers.

Examples of $C_{2-10}$ hydrocarbon groups having a valency of (p+r) and represented by $R^4$ include the following groups.

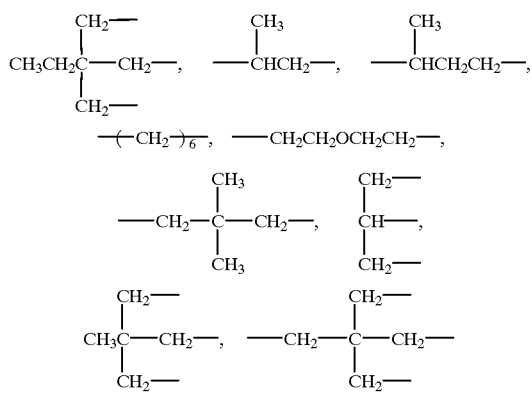

It is preferable to use the polyol compound (E) after silylation of hydroxyl groups, in order to reduce the viscosity of the coating composition. The proportion of silylated hydroxyl groups to all the hydroxyl groups is preferably 20 mol % or more, more preferably 50 mol % or more. The silylated hydroxyl group in the compound (E) is a group represented by the formula (2) shown above, and the silylation can be carried out by methods similar to those employed for silylating a hydroxyl group in the polymer (B-3).

In the composition of the invention, the reactive organopolysiloxane (D) and the compound (E) can be used each in a proportion of usually 50 wt. parts or less, preferably 3 to 50 wt. parts, more preferably 5 to 30 wt. parts, per 100 wt. parts of the compound (A) and epoxide (B) combined.

The composition of the invention may contain curing catalysts when so required. Usable curing catalysts include catalysts effective for the crosslinking reaction of the carboxyl group with the epoxy group, such as tetraethylammonium bromide, tetrabutylammonium bromide, tetraethylammonium chloride, tetrabutylphosphonium bromide, triphenylbenzylphosphonium chloride and like quaternary salt catalysts; and triethylamine, tributylamine and like amines. Among them, quaternary salt catalysts are preferable. Catalysts consisting of substantially equivalent amounts of the quaternary salt and a phosphoric acid compound (e.g., monobutylphosphoric acid or dibutylphosphoric acid) are also preferable, since such catalysts improve the storage stability of the coating composition and prevent lowering of the spray coating amenability owing to the reduction of the electric resistance of the coating composition, without impairing the catalytic action.

Also usable are catalysts effective for the crosslinking reaction of the hydrolyzable alkoxysilyl group, such as dibutyltin dilaurate, dibutyltin diacetate and like tin catalysts; tetrabutyl titanate and like titanium catalysts; and triethylamine, tributylamine and like amines.

The above catalysts can be used singly or in combination. In view of curability, scratch resistance and storage stability, combined use of catalysts having different catalystic actions is desirable.

When necessary, the composition of the invention may contain dehydrating agents such as trimethyl orthoacetate to inhibit degradation of the composition caused by moisture in the solvent or in the air.

Known pigments such as coloring pigments, extender pigments and anti-corrosive pigments can be added to the composition of the invention, when so required.

Useful coloring pigments include organic pigments such as quinacridone red and like quinacridone pigments, pigment red and like azo pigments, phthalocyanine blue, phthalocyanine green, perylene red and like phthalocyanine pigments, inorganic pigments such as titanium oxide and carbon black, metallic pigments such as aluminum flakes, nickel flakes, copper flakes, brass flakes, chrome flakes, pearl mica and colored pearl mica.

Optionally, the composition of the invention may contain resins such as polyester resins, alkyd resins, silicon resins and fluorine resins, and may also contain a minor amount of melamine resins, blocked isocyanate and like crosslinking agents. Further, the composition of the invention may contain, when necessary, conventional additives for coating compositions such as UV absorbers, antioxidants, surface modifiers and defoaming agents.

The composition of the invention is usually used as an organic solvent-based high solid coating composition. Usable solvents include various organic solvents for coating compositions, such as aromatic or aliphatic hydrocarbon solvents, alcohol solvents, ester solvents, ketone solvents and ether solvents. Organic solvents used for preparing the polymers as the components of the composition can be used as such, or additional organic solvents may be used. The solid content of the composition can be as high as 65 wt. % or more, and is preferably about 65 to 90 wt. %, more preferably about 70 to 90 wt. %.

The composition of the invention can be applied to various substrates by conventional coating methods, and can be fully cured by heating at about 100 to 180° C. for about 10 to 60 minutes, giving a coating film having high resistance to acids and scratches.

The method for forming a topcoat according to the invention comprises successively forming on a substrate a colored base coat and a clear coat, wherein the clear coat is formed from the composition of the invention.

The substrates for forming the topcoat include steel panels treated by chemical conversion, electrocoated with a primer and optionally coated with an intercoat; various plastic substrates optionally surface-treated and coated with a primer and an intercoat; and composites of these substrates.

In the method of the invention, the composition of the invention may be used as the clear coat composition not containing a coloring pigment, or, when so required, the composition of the invention may contain coloring pigments in an amount that will not completely hide the colored base coat.

The method of the invention is particularly suitable for forming a topcoat on automotive exterior panels. The method can be carried out according to techniques known in automotive industries, for example, the 2-coat 1-bake or 2-coat 2-bake technique for forming a colored base coat and a clear coat; and the 3-coat 1-bake or 3-coat 2-bake technique for forming a colored base coat, a clear coat and a clear coat.

The most desirable technique for carrying out the method of the invention is the 2-coat 1-bake technique comprising coating a substrate with a colored base coat composition, coating the uncured base coat with a clear coat composition, and curing the two coats by heating.

Described below is the 2-coat 1-bake technique using the composition of the invention as the clear coat composition.

In the 2-coat 1-bake technique, the colored base coat composition is first applied to the above substrate by conventional coating methods such as spraying.

The colored base coat composition may be the composition of the invention containing coloring pigments, or may be a colored coating composition known per se and conventionally used for forming a topcoat.

Examples of known colored base coat compositions include those comprising curable resin components and the coloring pigment. Useful curable resin components are, for example, acrylic resin/amino resin mixtures, alkyd resin/amino resin mixtures, polyester resin/amino resin mixtures, acrylic resin/polyisocyanate mixtures, alkyd resin/polyisocyanate mixtures and polyester resin/polyisocyanate mixtures. The amino resins used in these mixtures are, for example, melamine resins. The known colored base coat compositions is not limited in form and may be, for example, organic solvent-based compositions, nonaqueous or an organic solvent-based composition having a solid content of about 15 to 65 wt. % (usually corresponding to about 10 to 55 vol. %) when applied by spraying. The clear coat composition is suitably an organic solvent-based composition having a solid content of about 65 to 90 wt. % (usually corresponding to about 58 to 87 vol. %) when applied by spraying.

Articles coated by the method of the invention have a coating film having excellent resistance to acids or excellent resistance to acids and scratches, and are especially suitable as automotive exterior panels.

The present invention is described below in more detail with reference to Preparation Examples, Examples and Comparative Examples wherein the parts and percentages are all by weight.

Examples of Coating Compositions Containing Silylated Carboxyl-containing Compound (A), Vinyl Polymer (B-1) or/and Epoxy Compound (B-3) and Crosslinked Particulate Polymer (C)

PREPARATION EXAMPLE 1

Preparation of Half Ester (a-1) Formed by Addition Reaction of Polyol with 1,2-acid Anhydride A 5-liter glass flask equipped with a stirrer, thermometer and condenser was charged with 236 parts of dispersions, aqueous solutions, aqueous dispersions and high solid compositions.

The device for spray coating may be any of those conventionally used, such as an air spray gun, an airless spray gun, an air spray electrostatic coater, an airless spray electrostatic coater and a rotary atomization electrostatic coater.

The colored base coat composition is applied preferably to a thickness of about 10 to 30 μm (when cured). The colored base coat thus applied is left to stand at room temperature for a few minutes or is force-dried at about 50 to 80° C. for a few minutes, and then coated with the composition of the invention as a clear coat composition.

Usable techniques and devices for applying the clear coat composition are those used for applying the colored base coat composition.

The clear coat composition is applied preferably to a thickness of about 20 to 80 μm (when cured).

The colored base coat and clear coat thus formed are cured at the same time by heating preferably at about 100 to 180° C. for about 10 to 60 minutes.

In the method of the invention, the colored base coat composition is suitably an aqueous composition 3-methyl-1,5-pentanediol, 134 parts of trimethylolpropane, 1078 parts of hexahydrophthalic anhydride and 780 parts of xylene. The mixture was heated to 120° C. in a nitrogen atmosphere to initiate a reaction. The reaction mixture was maintained at 120° C. for 4 hours and then cooled, giving a solution of half ester (a-1) of a solid content of 65%, a Gardner viscosity (25° C.) of R and an acid value of 271 mg KOH/g.

PREPARATION EXAMPLE 2

Preparation of Silylated Carboxyl-containing Compound (as-1)

A 3-liter four-necked flask equipped with a stirrer, thermometer, reflux condenser, nitrogen inlet and dropping device was charged with 1429 g of the solution of half ester (a-1) having a solid content of 65% obtained in Preparation Example 1, and 389 g of pyridine. Added dropwise to the mixture was 582 g of trimethylchlorosilane in a nitrogen atmosphere with stirring over a period of 1 hour. After completion of the dropwise addition, the mixture was further stirred at 40° C. for 6 hours and the solvent and unreacted compounds were removed under reduced pressure, followed by filtration. Xylene was added to the filtrate in such an amount that heated residue became 80%, giving a solution of silylated carboxyl-containing compound (as-1) having a Gardner viscosity (25° C.) of B. This compound is the one formed by trimethylsilylating 80 mole % of carboxyl of the half ester (a-1).

PREPARATION EXAMPLE 3

Preparation of Carboxyl-containing Acrylic Polymer (a-2)

A 5-liter glass flask equipped with a stirrer, thermometer and condenser was charged with 553 parts of xylene and 276 parts of 3-methoxybutyl acetate. The mixture was heated to 125° C. by an electrothermic mantle. At the same temperature, a mixture of the following monomer components and a polymerization initiator was added dropwise at a uniform rate over a period of 4 hours. p-Tert-butylperoxy-2-ethyl hexanoate is a polymerization initiator.

| | |
|---|---|
| n-Butyl methacrylate | 432 parts |
| Isobutyl methacrylate | 346 parts |
| Lauryl methacrylate | 360 parts |
| Styrene | 72 parts |
| Methacrylic acid | 86 parts |
| Acrylic acid | 144 parts |
| p-Tert-butylperoxy-2-ethyl hexanoate | 72 parts |

The mixture was aged for 30 minutes. Added dropwise was a mixture of 277 parts of 3-methoxybutyl acetate and 14.4 parts of p-tert-butylperoxy-2-ethyl hexanoate over a period of 2 hours. The mixture was aged for 2 hours, giving a solution of carboxyl-containing acrylic polymer (a-2).

The polymer solution obtained had a polymer solid content of 70% and a Gardner viscosity (25° C.) of V. The polymer had a number average molecular weight of 3,000 and an acid value of 117 mg KOH/g.

PREPARATION EXAMPLE 4
Preparation of Silylated Carboxyl-containing Compound (as-2)

A 3-liter four-necked flask equipped with a stirrer, thermometer, reflux condenser, nitrogen inlet and dropping device was charged with 1710 g of the solution of carboxyl-containing acrylic polymer (a-2) with a solid content of 70% obtained in Preparation Example 3 and 232 g of pyridine. Added dropwise to the mixture was 290 g of trimethylchlorosilane in a nitrogen atmosphere with stirring over a period of 1 hour. After completion of the dropwise addition, the mixture was further stirred at 40° C. for 6 hours and the solvent and unreacted compounds were removed under reduced pressure, followed by filtration. Xylene was added to the filtrate in such an amount that heated residue became 80%, giving a solution of silylated carboxyl-containing compound (as-2) having a Gardner viscosity of N. This compound is the one formed by trimethylsilylating 80 mole % of carboxyl of the acrylic polymer (a-2).

PREPARATION EXAMPLE 5
Preparation of Epoxy-, Hydroxyl- and Hydrolyzable Alkoxysilyl-containing Vinyl Polymer (b-1)

A 5-liter glass flask equipped with a stirrer, thermometer and condenser was charged with 410 parts of xylene and 77 parts of n-butanol. The mixture was heated to 125° C. by an electrothermic mantle. At the same temperature, a mixture of the following monomer components and a polymerization initiator was added dropwise at a uniform rate over a period of 4 hours. Azobisisobutyronitrile is a polymerization initiator.

| | |
|---|---|
| Glycidyl methacrylate | 504 parts |
| 4-Hydroxy-n-butyl acrylate | 72 parts |
| γ-Methacryloxypropyltriethoxysilane | 216 parts |
| n-Butyl acrylate | 360 parts |
| Styrene | 288 parts |
| Azobisisobutyronitrile | 72 parts |

The mixture was aged for 30 minutes. Added dropwise was a mixture of 90 parts of xylene, 40 parts of n-butanol and 14.4 parts of azobisisobutyronitrile over a period of 2 hours. The mixture was aged for 2 hours, giving a solution of acrylic polymer (b-1).

The polymer solution obtained had a polymer solid content of 70% and a Gardner viscosity (25° C.) of T. The polymer had a number average molecular weight of 2,000, an epoxy content of 2.12 mmol/g, a hydroxyl value of 26 mg KOH/g and an ethoxysilyl content of 1.55 mmol/g.

PREPARATION EXAMPLE 6
Preparation of Crosslinked Particulate Polymer (c-1)

A 1-liter flask equipped with a stirrer, thermometer, condenser and heating mantle was charged with 3547.5 parts of deionized water and 20 parts of "RATEMURU S-120A" (tradename, product of Kao Corp., sulfosuccinic acid type allyl-containing anionic reactive emulsifier, solid content of 50%), and the mixture was heated to 90° C. with stirring. To the mixture was added 20% of an aqueous solution of 12.5 parts of a water-soluble azoamide polymerization initiator "VA-086" (tradename, product of Wako Pure Chemical Ind. Ltd., 2,2'-azobis[2-methyl-N-(2-hydroxyethyl) propionamide]) in 500 parts of deionized water. After 15 minutes, 5% of a monomer mixture consisting of 150 parts of styrenes 550 parts of methyl methacrylate, 150 parts of n-butyl acrylate and 50 parts of 2-hydroxyethyl acrylate and 100 parts of 1,6-hexanediol diacrylate was added. The resulting mixture was further stirred for 30 minutes, and then dropwise addition of the remaining monomer mixture and polymerization initiator was started. The monomer mixture was added over a period of 3 hours, and the polymerization initiator over a period of 3.5 hours. During the addition, the polymerization temperature was maintained at 90° C. After completion of the dropwise addition of the aqueous solution of the polymerization initiator, the mixture was heated for 30 minutes to maintain the temperature at 90° C. and then cooled to room temperature. Subsequently, the mixture was filtered through a cloth filter, giving an aqueous dispersion of a crosslinked particulate polymer having a solid content of 20%.

The aqueous dispersion obtained was placed into a stainless steel vat and dried at 60° C. in an electric hot-air drier to obtain a solid resin. Thereafter, the resin was dispersed in a solvent mixture consisting of xylene and n-butyl alcohol in a weight ratio of 50/50 which had been heated to 60° C., giving a dispersion of a crosslinked particulate polymer (c-1) having a solid concentration of 15%.

The dispersion obtained had a Gardner viscosity (25° C.) of A2, and the particulate polymer had an average particle diameter of 70 nm (as measured with "Nanosizer N-4", a product of Coulter Co., Ltd.).

PREPARATION EXAMPLE 7
Preparation of Crosslinked Particulate Polymer (c-2)
(1) Preparation of Dispersion Stabilizing Resin One hundred parts of xylene was heated to 120° C., and the following monomers and polymerization initiator were added dropwise over a period of 3 hours. After completion of the dropwise addition, the resulting mixture was aged for 2 hours.

| | |
|---|---|
| γ-Methacryloxypropyltrimethoxysilane | 5 parts |
| Styrene | 10 parts |
| n-Butyl methacrylate | 35 parts |
| 2-Ethylhexyl methacrylate | 25 parts |
| Lauryl methacrylate | 25 parts |
| 2,2'-Azobisisobutyronitrile | 4 parts |

The obtained acrylic resin (dispersion stabilizing resin) varnish had a nonvolatile content of 50%, a Gardner viscosity (25° C.) of B and a weight average molecular weight of about 10,000.

(2) Preparation of Nonaqueous Dispersion of Crosslinked Particulate Polymer

Heptane 100 parts

The dispersion stabilizing resin varnish obtained above 83 parts

The above components were placed into a flask and refluxed by heating. The following monomers and polymerization initiator were added dropwise over a period of 3 hours, and the mixture was aged for 2 hours, giving a dispersion of a crosslinked particulate polymer (c-2) having a solid concentration of 50%.

| | |
|---|---|
| γ-Methacryloxypropyltrimethoxysilane | 20 parts |
| Styrene | 15 parts |
| Acrylonitrile | 15 parts |
| Methyl methacrylate | 50 parts |
| 2,2'-Azobisisobutyronitrile | 2 parts |

The dispersion obtained had a Gardner viscosity (25° C.) of Al. The particulate polymer had an average particle diameter of 300 nm (as measured with "Nanosizer N-4", product of Coulter Co., Ltd.).

PREPARATION EXAMPLE 8

Preparation of Aqueous Colored Base Coat Composition (M-1)

(1) Preparation of Aqueous Dispersion of Acrylic Resin (W-1)

A reactor was charged with 140 parts of deionized water, 2.5 parts of "NEWCOL 707SF" (tradename, product of Nihon Nyukazai Co., Ltd., surfactant, solid content of 30%) and 80 part of the monomer mixture (1) shown below. The mixture was stirred in a nitrogen stream. An emulsion consisting of 4 parts of 3% ammonium persulfate and 42 parts of deionized water was placed dropwise into the reactor over a period of 4 hours using a metering pump. After the addition, the mixture was aged for 1 hour.

| Monomer mixture (1) | |
|---|---|
| Methyl methacrylate | 55 parts |
| Styrene | 10 parts |
| n-Butyl acrylate | 9 parts |
| 2-Hydroxyethyl acrylate | 5 parts |
| Methacrylic acid | 1 part |

Then, 20.5 parts of the monomer mixture (2) shown below and 4 parts of 3% ammonium persulfate were concurrently added dropwise into the reactor over a period of 1.5 hours. After the addition, the mixture was aged for 1 hour and filtered at 30° C. through a 200-mesh nylon cloth filter. Deionized water was added, and the mixture was adjusted to pH 7.5 with dimethylaminoethanol, giving an aqueous dispersion of acrylic resin (W-1) having an average particle diameter of 0.1 $\mu$m, a glass transition temperature (Tg) of 46° C. and a nonvolatile content of 20%.

| Monomer mixture (2) | |
|---|---|
| Methyl methacrylate | 5 parts |
| n-Butyl acrylate | 7 parts |
| 2-Ethylhexyl acrylate | 5 parts |
| Methacrylic acid | 3 parts |
| "Newcol 707SF" | 0.5 part |

(2) Preparation of aqueous solution of acrylic resin (W-2)

A reactor was charged with 60 parts of butyl cellosolve and 15 parts of isobutyl alcohol. The mixture was heated to 115° C. in a nitrogen stream. At a temperature of 115° C., there was added a mixture of 26 parts of n-butyl acrylate, 47 parts of methyl methacrylate, 10 parts of styrene, 10 parts of 2-hydroxyethyl methacrylate, 6 parts of acrylic acid and 1 part of azobisisobutyronitrile over a period of 3 hours. After the addition, the mixture was aged at 115° C. for 30 minutes. A mixture of 1 part of azobisisobutyronitrile and 115 parts of butyl cellosolve was added dropwise over a period of 1 hour, followed by aging for 30 minutes. The mixture was filtered at 50° C. through a 200-mesh nylon cloth filter. The obtained reaction product had an acid value of 48 mg KOH/g, a Gardner viscosity (25° C.) of Z4, a nonvolatile content of 55% and a Tg of 45° C. The product was subjected to equivalent neutralization using dimethylaminoethanol. Then deionized water was added, giving an aqueous solution of acrylic resin (W-2) having a nonvolatile content of 50%.

(3) Preparation of an Aqueous Colored Base Coat Composition (M-1)

| | |
|---|---|
| Aqueous dispersion of acrylic resin (W-1) | 275 parts |
| Aqueous solution of acrylic resin (W-2) | 40 parts |
| "CYMEL 350" (tradename, product of Mitsui Cytec Co., Ltd., melamine resin) | 25 parts |
| "ALUMINUM PASTE AW-500B" (tradename, product of Asahi Chemical Metals Co., Ltd., metallic pigment) | 20 parts |
| Butyl cellosolve | 20 parts |
| Deionized water | 253 parts |

"THIXOL K-130B" (tradename, product of Kyoeisha Yushi Kagaku Kogyo KK, thickener) was added to the mixture of the above components to adjust the mixture to a viscosity of 3,000 cps as measured with a Brookfield viscometer (rotor revolution speed 6 rpm), giving an aqueous metallic coating composition (M-1) having a nonvolatile content of about 19%.

EXAMPLES 1–5 AND COMPARATIVE EXAMPLES 1–4

A solution of mixed resin was prepared using the components (on solid basis) shown in Table 1. To the solution were added 2 parts of a mixture of tetrabutylammonium bromide and monobutylphosphoric acid in equivalent amount, 1 part of "TINUVIN 900" (tradename, product of Ciba-Geigy, Ltd., ultraviolet absorber) and 0.1 part of "BYK-300" (tradename, product of BYK-Chemie Corp., surface modifier). The mixture was diluted with "SWASOL 1000" (tradename, product of Cosmo Oil Co., Ltd., hydrocarbon solvent) for adjustment to a viscosity of 30 seconds (Ford cup #4/20° C.). In this way, coating compositions of the invention and comparative coating compositions were prepared. Table 1 shows nonvolatile contents of the coating compositions when applied.

The compositions obtained were tested for storage stability by the following method.

Storage stability: A 150 g portion of the composition diluted to a viscosity of 30 seconds (Ford cup #4/20° C.) was placed into a glass bottle which was then sealed. The composition was stored at 40° C. for 2 weeks, and its viscosity (Ford cup #4/20° C.) was measured to check the degree of thickening. The results were evaluated by the following criteria:

A: viscosity less than 45 seconds (good storage stability),

B: viscosity of 45 seconds or more, and less than 60 seconds (slightly low storage stability), C: viscosity of at least 60 seconds (poor storage stability).

The results are shown in Table 1.

TABLE 1

| | Example | | | | | Comparative Example | | | |
|---|---|---|---|---|---|---|---|---|---|
| Component | 1 | 2 | 3 | 4 | 5 | 1 | 2 | 3 | 4 |
| Compound (A) | | | | | | | | | |
| as-1 (Preparation Example 2) | 35 | | 45 | 45 | 57 | | | | |
| as-2 (Preparation Example 4) | | 50 | | | | | | | |
| a-1 (Preparation Example 1, for comparison) | | | | | | 35 | | 45 | 45 |
| a-2 (Preparation Example 3, for comparison) | | | | | | | 50 | | |

TABLE 1-continued

| Component | Example | | | | | Comparative Example | | | |
|---|---|---|---|---|---|---|---|---|---|
| | 1 | 2 | 3 | 4 | 5 | 1 | 2 | 3 | 4 |
| Epoxide (B) | | | | | | | | | |
| b-1 (Preparation Example 5) | 62 | 47 | 32 | 42 | | 62 | 47 | 32 | 42 |
| b-2 | | | 20 | 10 | 40 | | | 20 | 10 |
| Crosslinked particulate polymer (C) | | | | | | | | | |
| c-1 (Preparation Example 6) | 3 | | 3 | 3 | 3 | 3 | | 3 | 3 |
| c-2 (Preparation Example 7) | | 3 | | | | | 3 | | |
| Polyol compound (E) | | | | 10 | | | | | 10 |
| e-1 | | | | | | | | | |
| Nonvolatile content when applied (%, Viscosity 30 sec.) | 71 | 66 | 77 | 75 | 82 | 54 | 46 | 62 | 60 |
| storage stability | A | A | A | A | A | B | A | B | B |

In Table 1, b-2 under Epoxide (B) is 3,4-epoxycyclohexylmethyl-3,4-epoxycyclohexanecarboxylate represented by the following formula.

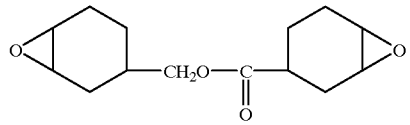

Also, e-1 under Polyol compound (E) is represented by the following formula.

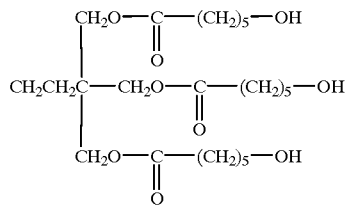

EXAMPLES 6 TO 10 AND COMPARATIVE EXAMPLES 5 TO 8

Topcoats were formed according to 2-coat 1-bake system in the following manner, using the coating compositions obtained in Examples 1 to 5 and Comparative Examples 1 to 4 as clear coat compositions.

A dull steel panel of 0.8 mm thickness treated by chemical conversion with zinc phosphate was prepared and an epoxy-based cationic electorodepositable coating composition was electrophoretically coated thereon to give a coating film of about 20 μm thickness (when cured). The coated panel was baked at 170° C. for 20 minutes, polished with sand paper (#400), and degreased by wiping with petroleum benzine. Then an automotive intercoating surfacer was air sprayed over the coated panel to give a coating film of about 25 μm thickness (when cured). The coated panel was baked at 140° C. for 30 minutes, subjected to wet rubbing with sand paper (#400), dehydrated for drying, and degreased by wiping with petroleum benzine, giving a test substrate.

The aqueous colored base coat composition (M-1) obtained in Preparation Example 8 was applied to the test substrate to give a coating film of a thickness of 20 μm (when cured). The coated test substrate was force-dried at 80° C. for 10 minutes. Several test substrates were prepared in this manner.

The clear coat compositions prepared in Examples 1 to 5 and Comparative Examples 1 to 4 were applied to the coated test substrates respectively-to give a coating film of 40 μm thickness (when cured). Each coated panel was heated at 140° C. for 30 minutes, whereby the two coats were cured to form a topcoat.

The clear coat compositions were tested for coating amenability as follows. Maximum popping-free film thickness: The maximum film thickness (μm) in which the coating film has no popping when formed on a static perpendicular surface. Maximum sagging-free film thickness: The maximum film thickness (μm) in which the coating film has no sagging when formed on a static perpendicular surface.

The topcoats formed above were tested for performances as follows.

Film appearance: The coating surface was visually inspected and evaluated on the following scale:
A: free of abnormality and excellent in surface smoothness,
B: orange peel or considerably rough and poor in surface smoothness.

Acid resistance: A half area of the coated panel was immersed in a 40% solution of sulfuric acid. Then, the coated panel was left to stand at 50° C. for 5 hours, followed by washing with water. The surface of the coated panel was visually inspected and evaluated on the following scale:
A: no change,
B: substantially no change in the coating surface but a slight difference in film thickness between the immersed portion and unimmersed portion,
C: blushing on the coating surface.

Impact resistance: The coated panel was tested with a Du Pont impact tester using a weight of 500 g with a tip 0.5 inch in radius. The results were evaluated in terms of the maximum height (5 cm calibration) at which no cracking was caused by the weight dropped onto the coated panel. When no cracking occurred with the weight dropped from a height of 50 cm, the results were described as 50<.

Water resistance: The coated panel was dipped in warm water maintained at 40° C. for 240 hours and washed with water. The surface of the coated panel was visually inspected and evaluated on the following scale:
A: no change,
B: slight dulling on the coating surface,
C: blushing on the coating surface.

Recoat adhesion: The applied base coat composition and clear coat composition were baked at 140° C. for 30 minutes to make a first topcoat. Then the same base coat composition and clear coat composition were applied in the same manner to the coated panel. Thereafter the coated panel was baked at 120° C. for 30 minutes to make a second topcoat. The coated panel was cut crosswise to reach the substrate, giving 100 squares with a spacing of 1 mm. A cellophane adhesive tape was applied to and then peeled from the cut surface. The adhesion between the first and the second topcoats was evaluated on the following scale:
A: no peeling,
B: slightly peeled,
C: considerably peeled.

The results are shown in Table 2.

TABLE 2

|  | Example | | | | | Comparative Example | | | |
| --- | --- | --- | --- | --- | --- | --- | --- | --- | --- |
|  | 6 | 7 | 8 | 9 | 10 | 5 | 6 | 7 | 8 |
| Base coat composition | M-1 | M-1 | M-1 | M-1 | M-1 | M-1 | M-1 | M-1 | M-1 |
| Clear coat composition | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
| Properties |  |  |  |  |  |  |  |  |  |
| Maximum popping-free film thickness ($\mu$m) | 55 | 60 | 60 | 60 | 60 | 50 | 45 | 55 | 55 |
| Maximum sagging-free film thickness ($\mu$m) | 55 | 45 | 50 | 50 | 50 | 45 | 55 | 50 | 50 |
| Film appearance | A | A | A | A | A | A | A | A | A |
| Acid resistance | A | A | A | A | A | A | A | A | A |
| Impact resistance | 50< | 50< | 50< | 50< | 50< | 50< | 50< | 50< | 50< |
| Water resistance | A | A | A | A | A | A | A | A | A |
| Recoat adhesion | A | A | A | A | B | A | B | A | A |

As is clear from Table 2, coating compositions of the invention used as clear coat compositions are approximately equivalent in performances to comparative coating compositions, in spite of their higher solid concentrations than the comparative coating compositions.

Examples of Coating Compositions Containing Silylated Carboxyl-containing Compound (A), Vinyl Polymer (B-1) or/and Epoxy Compound (B-3), Crosslinked Particulate Polymer (C) and Reactive Organopolysiloxane (D)

PREPARATION EXAMPLE 9
Preparation of Epoxy-, Hydroxyl- and Hydrolyzable Alkoxysilyl-containing Vinyl Polymer (b-3)

A 5-liter glass flask equipped with a stirrer, thermometer and condenser was charged with 410 parts of xylene and 77 parts of n-butanol. The mixture was heated to 125° C. by an electrothermic mantle. At the same temperature, a mixture of the following monomer components and a polymerization initiator was added dropwise at a uniform rate over a period of 4 hours. Azobisisobutyronitrile is a polymerization initiator.

| | |
| --- | --- |
| Glycidyl methacrylate | 504 parts |
| 4-Hydroxy-n-butyl acrylate | 216 parts |
| γ-Methacryloxypropyltriethoxysilane | 216 parts |
| n-Butyl acrylate | 216 parts |
| Styrene | 288 parts |
| Azobisisobutyronitrile | 72 parts |

The mixture was aged for 30 minutes. Added dropwise was a mixture of 90 parts of xylene, 40 parts of n-butanol and 14.4 parts of azobisisobutyronitrile over a period of 2 hours. The mixture was aged for 2 hours, giving a solution of acrylic polymer (b-3).

The polymer solution obtained had a polymer solid content of 70% and a Gardner viscosity (25° C.) of V. The polymer had a number average molecular weight of 2,000, an epoxy content of 2.12 mmol/g, a hydroxyl value of 78 mg KOH/g and an ethoxysilyl content of 1.55 mmol/g.

EXAMPLES 11–15 AND COMPARATIVE EXAMPLES 9–12

A solution of mixed resin was prepared using the components (on solid basis) shown in Table 3. To the solution were added 2 parts of a mixture of tetrabutylammonium bromide and monobutylphosphoric acid in equivalent amount, 1 part of "TINUVIN 900" (tradename, product of Ciba-Geigy, Ltd., ultraviolet absorber) and 0.1 part of "BYK-300" (tradename, product of BYK-Chemie Corp., surface modifier). The mixture was diluted with "SWASOL 1000" (tradename, product of Cosmo Oil Co., Ltd., hydrocarbon solvent) for adjustment to a viscosity of 30 seconds (Ford cup #4/20° C.). In this way, coating compositions of the invention and comparative coating compositions were prepared. Table 3 shows nonvolatile contents of the coating compositions when applied.

The compositions obtained were tested for storage stability by the foregoing method. The results are shown in Table 3.

TABLE 3

|  | Example | | | | | Comparative Example | | | |
| --- | --- | --- | --- | --- | --- | --- | --- | --- | --- |
| Component | 11 | 12 | 13 | 14 | 15 | 9 | 10 | 11 | 12 |
| Compound (A) | | | | | | | | | |
| as-1 (Preparation Example 2) | 30 |  | 40 |  | 50 |  |  |  |  |
| as-2 (Preparation Example 4) |  | 45 |  | 50 |  |  |  |  |  |
| a-1 (Preparation Example 1, for comparison) |  |  |  |  |  | 30 |  | 40 |  |
| a-2 (Preparation Example 3, for comparison) |  |  |  |  |  |  | 45 |  | 50 |
| Epoxide (B) | | | | | | | | | |
| b-2 |  |  | 10 | 5 | 37 |  |  | 10 | 5 |
| b-3 (Preparation Example 9) | 57 | 42 | 27 | 22 |  | 57 | 42 | 27 | 22 |
| Crosslinked particulate polymer (C) | | | | | | | | | |
| c-1 (Preparation Example 6) | 3 |  | 3 | 3 | 3 | 3 |  | 3 | 3 |
| c-2 (Preparation Example 7) |  | 3 |  |  |  |  | 3 |  |  |
| Reactive organopolysiloxane (D) "X41-1067" | 10 | 10 | 20 | 20 | 10 | 10 | 10 | 20 | 20 |
| Nonvolatile content when applied (%, Viscosity 30 sec.) | 72 | 72 | 81 | 78 | 85 | 60 | 59 | 67 | 63 |
| Storage stability | A | A | A | A | A | B | A | B | A |

In Table 3, b-2 under Epoxide (B) is the same as above. "X41-106-7" (tradename, product of Shinetsu Kagaku KK) under Reactive organopolysiloxane (D) is a glycidyl- and methoxysilyl-containing organopolysiloxane having a number average molecular weight of 740 and represented by the following formula.

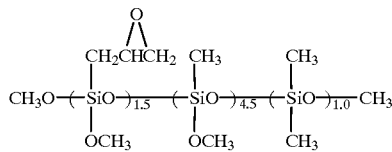

EXAMPLES 16 TO 20 AND COMPARATIVE EXAMPLES 13 TO 16

Topcoats were formed according to 2-coat 1-bake system in a similar manner as in Examples 6–10, using the coating compositions obtained in Examples 11 to 15 and Comparative Examples 9 to 12 as clear coat compositions.

The clear coat compositions were tested for coating amenability in a similar manner as mentioned above.

The topcoats formed were tested for performances in film appearance, acid resistance, impact resistance, water resistance and recoat adhesion, in a similar manner as mentioned above. Further, the topcoats were tested for scratch resistance in the following manner.

Scratch resistance: An automobile with a coated test panel attached to the roof was washed 15 times in a car washer "PO 20F WRC" (tradename, a product of Yasui Sangyo Co., Ltd.). The surface of the coated panel was visually inspected and evaluated on the following scale:

A: substantially no scratch mark was found,
B: slight scratch marks were found but to a negligible extent,
C: noticeable scratch marks were found.

The results are shown in Table 4.

tive compositions, the coating compositions of the invention are approximately equivalent in performances to the comparative compositions, as shown in Table 4.

Examples of Coating Compositions Containing Silylated Carboxyl-containing Compound (A), Silylated Vinyl Polymer (B-2) or/and Epoxy Compound (B-3), Crosslinked Particulate Polymer (C) and Reactive Organopolysiloxane (D)

PREPARATION EXAMPLE 10

Preparation of Silylated Hydroxyl-, Epoxy- and Hydrolyzable Alkoxysilyl-containing Vinyl Polymer (bs-1)

A 5-liter glass flask equipped with a stirrer, thermometer and condenser was charged with 410 parts of xylene and 77 parts of n-butanol. The mixture was heated to 125° C. by an electrothermic mantle. At the same temperature, a mixture of the following monomer components and a polymerization initiator was added dropwise at a uniform rate over a period of 4 hours. Silylated 4-hydroxy-n-butyl acrylate is a compound formed by trimethylsilylating hydroxyl groups of 4-hydroxy-n-butyl acrylate, and the silylated hydroxyl group is represented by the formula (2) wherein all of $R^1$, $R^2$ and $R^3$ are methyl groups. Azobisisobutyronitrile is a polymerization initiator.

| | |
|---|---|
| Glycidyl methacrylate | 504 parts |
| Silylated 4-Hydroxy-n-butyl acrylate | 216 parts |
| γ-Methacryloxypropyltriethoxysilane | 216 parts |
| n-Butyl acrylate | 288 parts |
| Styrene | 288 parts |
| Azobisisobutyronitrile | 72 parts |

The mixture was aged for 30 minutes. Added dropwise was a mixture of 90 parts of xylene, 40 parts of n-butanol

TABLE 4

| | Example | | | | | Comparative Example | | | |
|---|---|---|---|---|---|---|---|---|---|
| | 16 | 17 | 18 | 19 | 20 | 13 | 14 | 15 | 16 |
| Base coat composition | M-1 | M-1 | M-1 | M-1 | M-1 | M-1 | M-1 | M-1 | M-1 |
| Clear coat composition | Ex. 11 | Ex. 12 | Ex. 13 | Ex. 14 | Ex. 15 | Comp. Ex. 9 | Comp. Ex. 10 | Comp. Ex. 11 | Comp. Ex. 12 |
| Properties | | | | | | | | | |
| Maximum popping-free film thickness (μm) | 60 | 55 | 60 | 60 | 60 | 50 | 45 | 55 | 55 |
| Maximum sagging-free film thickness (μm) | 45 | 55 | 45 | 50 | 45 | 45 | 55 | 45 | 50 |
| Film appearance | A | A | A | A | A | A | A | A | A |
| Acid resistance | A | A | A | A | A | A | A | A | A |
| Scratch resistance | A | B | A | A | B | A | B | A | A |
| Impact resistance | 50< | 50< | 50< | 50< | 50< | 50< | 50< | 50< | 50< |
| Water resistance | A | A | A | A | A | A | A | A | A |
| Recoat adhesion | A | A | A | A | A | A | A | A | A |

As is clear from Table 4, coating compositions of the invention used as clear coat compositions are approximately equivalent in performances to comparative coating compositions, in spite of their higher solid concentrations than the comparative coating compositions.

As shown in Table 3, silylated carboxyl-containing compounds are used in coating compositions of Examples 11–15 according to the invention, whereas the corresponding unsilylated carboxyl-containing compounds are used in comparative coating compositions of Comparative Examples 9–12. Because of this difference, in spite of 12–15% higher solid concentration (nonvolatile contents) than the comparaand 14.4 parts of azobisisobutyronitrile over a period of 2 hours. The mixture was aged for 2 hours, giving a solution of acrylic polymer (bs-1).

The polymer solution obtained had a polymer solid content of 71% and a Gardner viscosity (25° C.) of U. The polymer had a number average molecular weight of about 2,000, an epoxy content of 2.12 mmol/g, a hydroxyl value of 39 mg KOH/g with silyl groups being eliminated from silylated hydroxyl groups, and an ethoxysilyl content of 1.55 mmol/g.

PREPARATION EXAMPLE 11

Preparation of Silylated Hydroxyl-, Epoxy- and Hydrolyzable Alkoxysilyl-containing Vinyl Polymer (bs-2)

A 5-liter glass flask equipped with a stirrer, thermometer and condenser was charged with 410 parts of xylene and 77 parts of n-butanol. The mixture was heated to 125° C. by an electrothermic mantle. At the same temperature, a mixture of the following monomer components and a polymerization initiator was added dropwise at a uniform rate over a period of 4 hours. Silylated 4-hydroxy-n-butyl acrylate is a compound formed by trimethylsilylating hydroxyl groups of 4-hydroxy-n-butyl acrylate, and the silylated hydroxyl group is represented by the formula (2) wherein all of $R^1$, $R^2$ and $R^3$ are methyl groups. Azobisisobutyronitrile is a polymerization initiator.

| | |
|---|---|
| Glycidyl methacrylate | 504 parts |
| Silylated 4-hydroxy-n-butyl acrylate | 432 parts |
| γ-Methacryloxypropyltriethoxysilane | 216 parts |
| n-Butyl acrylate | 144 parts |
| Styrene | 288 parts |
| Azobisisobutyronitrile | 72 parts |

The mixture was aged for 30 minutes. Added dropwise was a mixture of 90 parts of xylene, 40 parts of n-butanol and 14.4 parts of azobisisobutyronitrile over a period of 2 hours. The mixture was aged for 2 hours, giving a solution of acrylic polymer (bs-2).

The polymer solution obtained had a polymer solid content of 72% and a Gardner viscosity (25° C.) of W. The polymer had a number average molecular weight of about 2,000, an epoxy content of 2.12 mmol/g, a hydroxyl value of 78 mg KOH/g with silyl groups being eliminated from silylated hydroxyl groups, and an ethoxysilyl content of 1.55 mmol/g.

EXAMPLES 21–26

A solution of mixed resin was prepared using the components (on solid basis) shown in Table 5. To the solution were added 2 parts of a mixture of tetrabutylammonium bromide and monobutylphosphoric acid in equivalent amount, 1 part of "TINUVIN 900" (tradename, product of Ciba-Geigy, Ltd., ultraviolet absorber) and 0.1 part of "BYK-300" (tradename, product of BYK-Chemie Corp., surface modifier). The mixture was diluted with "SWASOL 1000" (tradename, product of Cosmo Oil Co., Ltd., hydrocarbon solvent) for adjustment to a viscosity of 30 seconds (Ford cup #4/20° C.). In this way, coating compositions of the invention were prepared. Table 5 shows nonvolatile contents of the coating compositions when applied.

The compositions obtained were tested for storage stability by the foregoing method. The results are shown in Table 5.

In Table 5, b-2 under Epoxide (B), "X41-1067" under Reactive organopolysiloxane (D) and e-1 under Polyol compound (E) are the same as above. Also, e-2 under Polyol compound (E) is a trimethylsilylated polyol compound represented by the following formula.

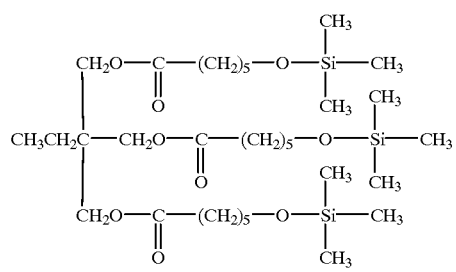

EXAMPLES 27–32

Topcoats were formed according to 2-coat 1-bake system in a similar manner as in Examples 6 to 10, using the coating compositions obtained in Examples 21 to 26 as clear coat compositions.

The clear coat compositions were tested for coating amenability in a similar manner as mentioned above.

The topcoats formed were tested for performances in film appearance, acid resistance, impact resistance, water resistance, recoat adhesion and scratch resistance, in a similar manner as mentioned above.

The results are shown in Table 6.

TABLE 5

| | Example | | | | | |
|---|---|---|---|---|---|---|
| Component | 21 | 22 | 23 | 24 | 25 | 26 |
| Compound (A) | | | | | | |
| as-1 (Preparation Example 2) | 30 | 30 | 20 | 35 | | 20 |
| as-2 (Preparation Example 4) | | | | | 35 | |
| Epoxide (B) | | | | | | |
| bs-1 (Preparation Example 10) | 57 | | 37 | 32 | 22 | 37 |
| bs-2 (Preparation Example 11) | | 57 | | | | |
| b-2 | | | | 10 | 10 | |
| Crosslinked particulate polymer (C) | | | | | | |
| c-1 (Preparation Example 6) | 3 | 3 | 3 | | | 3 |
| c-2 (Preparation Example 7) | | | | 3 | 3 | |
| Reactive organopolysiloxane (D) "X41-1067" | 10 | 10 | 20 | 10 | 20 | 20 |
| Polyol compound (E) | | | | | | |
| e-1 | | | | | | 20 |
| e-2 | | | 20 | 10 | 10 | |
| Nonvolatile content when applied (%, Viscosity 30 sec.) | 75 | 76 | 88 | 85 | 75 | 78 |
| Storage stability | A | A | A | A | A | A |

TABLE 6

| | Example | | | | | |
|---|---|---|---|---|---|---|
| | 27 | 28 | 29 | 30 | 31 | 32 |
| Base coat composition | M-1 | M-1 | M-1 | M-1 | M-1 | M-1 |
| Clear coat composition | Ex. 21 | Ex. 22 | Ex. 23 | Ex. 24 | Ex. 25 | Ex. 26 |
| Properties | | | | | | |
| Maximum popping-free film thickness (μm) | 55 | 60 | 60 | 60 | 60 | 60 |
| Maximum sagging-free film thickness (μm) | 55 | 50 | 50 | 50 | 50 | 50 |
| Film appearance | A | A | A | A | A | A |

TABLE 6-continued

| | Example | | | | | |
|---|---|---|---|---|---|---|
| | 27 | 28 | 29 | 30 | 31 | 32 |
| Acid resistance | A | A | A | A | A | A |
| Scratch resistance | A | A | A | A | A | A |
| Impact resistance | 50< | 50< | 50< | 50< | 50< | 50< |
| Water resistance | A | A | A | A | A | A |
| Recoat adhesion | A | A | A | A | A | A |

As is clear from Table 6, coating compositions of the invention used as clear coat compositions are approximately equivalent in performances to the foregoing comparative coating compositions, in spite of their higher solid concentration than the comparative coating compositions.

According to the invention, there are provided an organic solvent-based heat-curable high solid coating composition having a solid content of 65 wt. % or more, and also a method for forming a topcoat using said composition. This coating composition and method provide a coating film with high resistance to acids as well as excellent low-temperature curability, storage stability and recoat adhesion, thus producing remarkable effects.

Such a high solid content of the coating composition of the invention is realized because thickening of the composition caused by carboxyl groups is suppressed by specific silylation of carboxyl groups in the compound (A). When the silylated carboxyl group is heated for curing, a silyl group dissociates from the carboxyl group to regenerate a free carboxyl group. The free carboxyl group reacts with an epoxy group for crosslinking, resulting in good curability.

When epoxide (B) in the coating composition of the invention is an epoxy-, specifically silylated hydroxyl- and hydrolyzable alkoxysilyl-containing vinyl polymer (B-2), thickening of the composition caused by hydroxyl groups is suppressed, so that a further high solid content of the composition can be achieved. When the silylated hydroxyl group is heated for curing, a silyl group dissociates from the hydroxyl group to regenerate a free hydroxyl group. The free hydroxyl group reacts for crosslinking, resulting in good curability. Further, the hydroxyl group contributes to improvement of adhesion of the coating film.

The coating composition of the invention may optionally include a reactive organopolysiloxane (D) and a polyol compound (E). Addition of these compounds can further increase solid content of the composition. In particular, the reactive organopolysiloxane imparts high acid resistance and high scratch resistance and largely increases the solid content of the composition so that a solid concentration of at least 70 wt. % can be easily achieved.

What is claimed is:

1. An organic solvent-based heat-curable high solid coating composition comprising:

(A) a carboxyl-containing compound having an acid value of 50 to 500 mg KOH/g, wherein 20 mol % or more of the carboxyl groups are silylated carboxyl groups represented by the formula

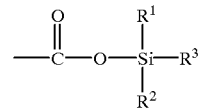

wherein $R^1$ and $R^2$ are the same or different and each represent a $C_{1-18}$ alkyl group, a $C_{1-6}$ alkoxyl group, a phenyl group, an aryl group, a trimethylsiloxy group, a hydrogen atom, a chlorine atom or a fluorine atom; and $R^3$ is a $C_{1-18}$ alkyl group, a phenyl group, an aryl group or a trimethylsiloxy group;

(B) at least one epoxide selected from (B-1) an epoxy-, hydroxyl- and hydrolyzable alkoxysilyl-containing vinyl polymer, (B-2) the vinyl polymer (B-1) wherein 20 mol % or more of the hydroxyl groups are silylated hydroxyl groups represented by the formula

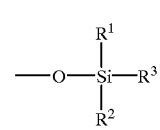

wherein $R^1$, $R^2$ and $R^3$ are as defined above, and (B-3) an epoxy compound having a number average molecular weight less than 1,000; and (C) a crosslinked particulate polymer;
the composition having a solid content of 65 wt. % or more.

2. The composition according to claim 1 wherein the silylated carboxyl group in the compound (A) is a group represented by the formula

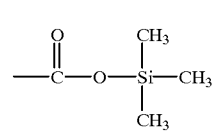

3. The composition according to claim 1 wherein the carboxyl-containing compound (A) is a vinyl polymer having at least one half-esterified acid anhydride group in the molecule and/or a half ester formed by addition reaction of a polyol with a 1,2-acid anhydride.

4. The composition according to claim 1 wherein the epoxide (B) is a combination of at least two members selected from the vinyl polymer (B-1), the silylated vinyl polymer (B-2) and the epoxy compound (B-3).

5. The composition according to claim 1 wherein the vinyl polymer (B-1) as the epoxide (B) is an acrylic polymer having an epoxy content of 0.5 to 5.0 mmol/g, a hydroxyl value of 10 to 200 mg KOH/g, and a hydrolyzable alkoxysilyl content of 0.3 to 5.0 mmol/g.

6. The composition according to claim 1 wherein the vinyl polymer (B-2) as the epoxide (B) is an acrylic polymer having an epoxy content of 0.5 to 5.0 mmol/g, a hydroxyl value of 10 to 200 mg KOH/g based on the silylated and unsilylated hydroxyl groups, and a hydrolyzable alkoxysilyl content of 0.3 to 5.0 mmol/g.

7. The composition according to claim 1 wherein the polymer (C) is a crosslinked particulate polymer obtained by subjecting a polymerizable monomer having at least two radically polymerizable unsaturated groups in the molecule and other radically polymerizable unsaturated monomer to emulsification polymerization in the presence of an allyl-containing reactive emulsifier, and/or a crosslinked particulate polymer obtained by polymerizing a radically polymerizable unsaturated monomer in an organic liquid using, as a dispersion stabilizing resin, a polymer containing an alkoxysilyl-containing vinyl monomer as an essential monomer component.

8. The composition according to claim 1 wherein the ratio of the compound (A) to the epoxide (B) is such that the equivalent ratio of the silylated and unsilylated carboxyl groups in the former to the epoxy group in the latter is 1:0.5 to 0.5:1, and that the proportion of the crosslinked particulate polymer (C) is 1 to 20 wt. parts per 100 wt. parts of the compound (A) and the epoxide (B) combined.

9. The composition according to claim 1 further containing (D) a reactive organopolysiloxane, the composition having a solid content of 70 wt. % or more.

10. The composition according to claim 9 wherein the reactive functional group of the reactive organopolysiloxane (D) is at least one member selected from an alkoxysilyl group, an alcoholic hydroxyl group and a glycidyl group.

11. The composition according to claim 1 or 9 further containing (E) a polyol compound having a molecular weight less than 1,000 and a hydroxyl value of 120 to 1,000 mg KOH/g.

12. The composition according to claim 11 wherein the polyol compound (E) is a compound represented by the formula

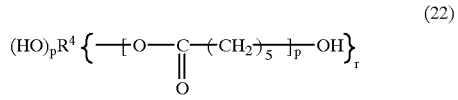

(22)

wherein $R^4$ is a $C_{2-10}$ hydrocarbon group with a valency of (p+r), q is an integer of 1 to 3, p is an integer of 0 to 2, r is an integer of 1 to 3, and (p+r) is an integer of 2 to 4.

13. The composition according to claim 11 wherein 20 mol % or more of the hydroxyl groups of the polyol compound (E) are silylated hydroxyl groups represented by the formula

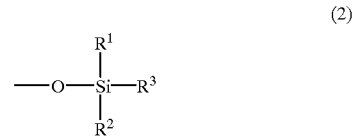

(2)

wherein $R^1$ and $R^2$ are the same or different and each represent a $C_{1-18}$ alkyl group, a $C_{1-6}$ alkoxyl group, a phenyl group, an aryl group, a trimethylsiloxy group, a hydrogen atom, a chlorine atom or a fluorine atom, $R^3$ is a $C_{1-18}$ alkyl group, a phenyl group, an aryl group or a trimethylsiloxy group.

14. A method for forming a topcoat comprising successively forming a colored base coat and a clear coat on a substrate, wherein the clear coat is formed from the coating composition according to claim 1 or 9.

15. The method according to claim 14 wherein the topcoat is formed by the 2-coat 1-bake technique comprising coating a substrate with a colored base coat composition, coating the uncured colored base coat with a clear coat composition and curing the two coats by heating.

16. The method according to claim 14 wherein the colored base coat is formed from an aqueous coating composition or an organic solvent-based coating composition having a solid content of 15 to 65 wt. % when applied by spraying, and wherein the clear coat is formed from an organic solvent-based coating composition having a solid content of 65 wt. % or more when applied by spraying.

17. An article coated by the method according to claim 14.

* * * * *